(12) United States Patent
Saito et al.

(10) Patent No.: US 7,580,017 B2
(45) Date of Patent: Aug. 25, 2009

(54) IMAGE DISPLAY MEDIUM AND IMAGE WRITING APPARATUS

(75) Inventors: Yasunori Saito, Kanagawa (JP); Tsunemasa Mita, Kanagawa (JP); Yasuo Yamamoto, Kanagawa (JP); Hiroaki Moriyama, Kanagawa (JP); Minoru Koshimizu, Kanagawa (JP); Takeo Kakinuma, Kanagawa (JP); Tsutomu Ishii, Kanagawa (JP); Takayuki Takeuchi, Kanagawa (JP); Shigehiko Sasaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 729 days.

(21) Appl. No.: 11/126,348

(22) Filed: May 11, 2005

(65) Prior Publication Data

US 2006/0001626 A1    Jan. 5, 2006

(30) Foreign Application Priority Data

May 11, 2004    (JP)  .............................. 2004-141658

(51) Int. Cl.
*G09G 3/34*    (2006.01)
(52) U.S. Cl. ....................................... 345/84
(58) Field of Classification Search .................... 345/84
See application file for complete search history.

(56) References Cited

U.S. PATENT DOCUMENTS

| 5,130,829 | A | * | 7/1992 | Shannon ...................... 349/111 |
| 6,645,685 | B2 | * | 11/2003 | Takata et al. .................. 430/31 |
| 6,693,620 | B1 | * | 2/2004 | Herb et al. .................... 345/107 |
| 6,753,999 | B2 | * | 6/2004 | Zehner et al. ................ 359/296 |
| 2003/0076573 | A1 | * | 4/2003 | Gates et al. .................. 359/245 |
| 2007/0076577 | A1 | * | 4/2007 | Furuichi ................... 369/275.4 |
| 2007/0216708 | A1 | * | 9/2007 | Mackay ...................... 345/619 |

FOREIGN PATENT DOCUMENTS

| JP | A 08-201782 | 8/1996 |
| JP | A 2001-301233 | 10/2001 |

* cited by examiner

*Primary Examiner*—Amr Awad
*Assistant Examiner*—Tony Davis
(74) *Attorney, Agent, or Firm*—Oliff & Berridge, PLC

(57) ABSTRACT

A voltage is supplied from an image writing apparatus to the power receiving electrode of an electronic paper and an optical signal is applied to light receiving elements of the electronic paper from the LEDs of the image writing apparatus. Then, the light receiving elements perform a switching operation to apply the voltage to row electrodes and column electrodes of a display unit including a plurality of pixels, thus making display.

33 Claims, 24 Drawing Sheets

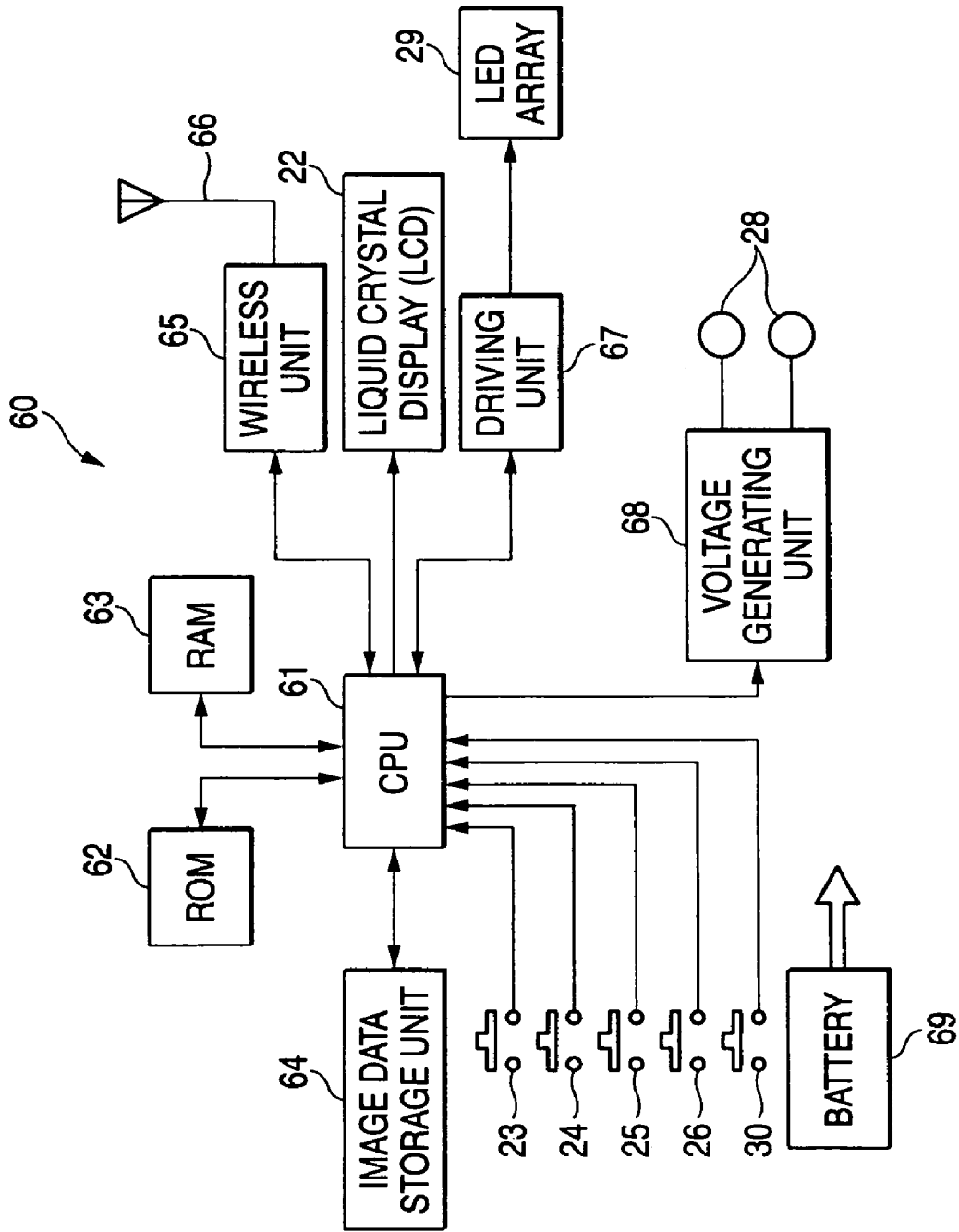

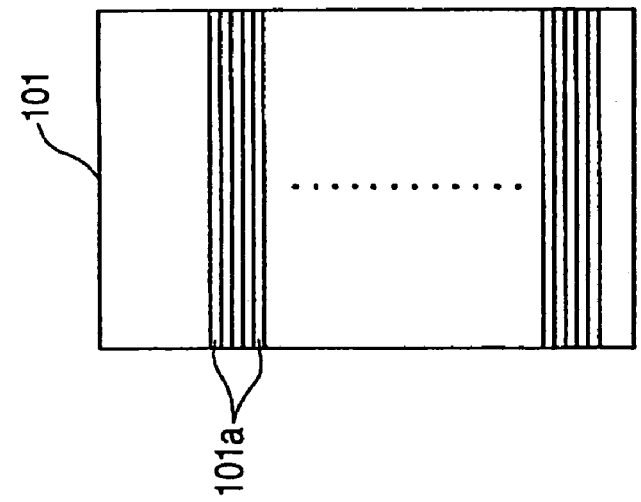
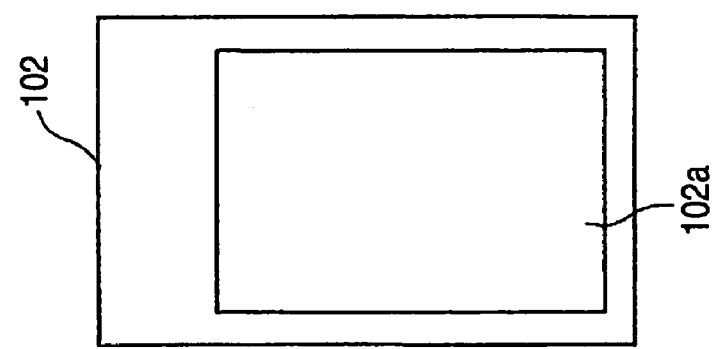
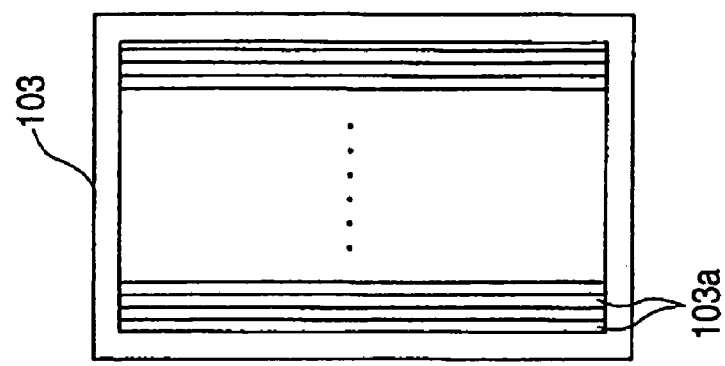

IMAGE DISPLAY MEDIUM AND IMAGE WRITING APPARATUS

BACKGROUND OF THE INVENTION

1. Field of the Invention

This invention relates to an image display medium having a memory characteristic and its image writing apparatus, and more particularly to an image display medium with high reliability and capable of realizing cost reduction, compactness and flexibility, and an image writing apparatus capable of realizing compactness.

2. Description of the Related Art

In recent years, as an image display medium, in addition to a paper medium and an electronic display device, the image display medium called electronic paper or digital paper having both advantages of the electronic display device and paper has been widely noticed.

This image display medium, which has the memory characteristic for display, has only to be supplied with energy for write by a driving device or an external information writing device only when information is rewritten, and is not required to be supplied with energy for maintaining the display. So it is possible to take out only the image display medium from the image writing apparatus after the information has been written so that it is carried easily like a sheet medium, superposed or arranged to write the information on a hand.

As the image display medium having the memory characteristic as described above, known are an optical-writing type image display medium in which the image is visually and erasably stored and an image writing apparatus for writing the image into the image display medium (For example, JP-A-2001-301233 ([0044]-[0047], FIG. 4).

The image display medium described in JP-A-2001-301233 has a liquid crystal layer and a photoconductive layer whose resistance is varied by light irradiation which are stacked between a pair of transparent electrodes. In the apparatus for writing the image on the image display medium, with the image display medium transported from a storage unit being in intimate contact with a liquid optical crystal output device, the image is displayed on the liquid crystal optical output device illuminated with backlight from background and the image light is projected onto the photoconductive layer of the image display medium so that a resistance distribution based on an optical pattern is generated on the photoconductive layer. And a divided voltage distribution based on the resistance distribution in the photoconductive layer is applied to the liquid crystal layer by applying a voltage between the transparent electrodes so that the image corresponding to the divided voltage distribution is recorded on the liquid crystal layer.

Generally, the manufacturer of the image display medium is different from the manufacturer for its driving circuit and others. Therefore the LSI and others constituting the driving circuit are not mounted on a mounting board of the image display medium. A power source and an electric signal for display driving is supplied through a flexible board, and for its connecting processing, terminals and soldering are employed.

However the connection using the flexible board is likely to generate short-circuiting, electrical corrosion and wire break among the terminals and electrodes, and is low in the reliability to vibration. In order to obviate such an inconvenience, by converting the electrical signal into an optical signal through e.g. LED and also receive the optical signal from the LED by a light receiving element located at a usual electrode position so that an electric signal is obtained through photoelectric conversion, a photo-coupler device making unnecessary the connection by the flexible board has been proposed (for example, JP-A-8-201782 ([0016], [0017], FIG. 1, FIG. 2).

SUMMARY OF THE INVENTION

However, according to a conventional image display medium, where the cost reduction, compactness and flexibility of the image display medium as described in JP-A-2001-301233 is indented, a driving IC will not be loaded on the image display medium, but loaded on the side of the image writing apparatus. In this case, the connection between the image display medium side and the driving IC are implemented by pressure-welding pins on electrodes or by means of the configuration as described in Patent Reference 2. However, in using the pins, it is difficult to bring all of large number of pins into contact with the electrodes. Further, in the configuration described in JP-A-8-201782, the light receiving elements on the display panel are arranged on a line on the electrode terminals. This increases the size of the device on the writing side, and makes it impossible to realize its compactness. Further, in order to carry out the photoelectric conversion on the display panel, a battery is required, thus leading to cost increase.

Therefore an object of this invention is to provide an image display medium with high reliability capable of realizing cost reduction, compactness and flexibility.

Another object of this invention is to provide an image writing apparatus capable of realizing its compactness.

In order to attain the above object, in accordance with the first aspect, there is provided an image display medium comprising a display unit having a memory characteristic including a plurality of pixels, a pair of input terminals externally supplied with a voltage, and a selecting unit for receiving a driving signal by external light, heat, magnetic field or pressure to selectively apply the voltage supplied to said pair of input terminals to said plurality of pixels on the basis of said driving signal.

The above selecting unit can be constructed by a plurality of function elements for applying the above voltage in such a manner that it is operated by the light, heat, magnetic field or pressure received as the driving signal. By receiving the external driving signal without using the contact, the number of poor contacts can be reduced, thereby improving the reliability.

In accordance with the above image display medium, the number of terminals supplied with the voltage and the driving signal by light, heat, magnetic field or pressure is externally received from e.g. an image writing apparatus so that the number of poor contacts can be reduced, thereby improving the reliability. In addition, the battery is not required and loading of the driving IC is not required. This enables the cost reduction, compactness and flexibility.

In order to attain the above object, in accordance with the second aspect of this invention, there is provided an image writing apparatus comprising a pair of output terminals for externally supplying a voltage, a plurality of driving signal generating elements for externally generating a driving signal by light, heat, magnetic field or pressure, and a control unit for controlling said driving signal generating elements on the basis of the image signal.

The driving signal generating elements may be those capable of operating the active elements of the image display medium using light, heat, magnetic field or pressure. By transmitting the driving signal to the image display medium without using any contact, the number of poor contacts can be reduced, thereby improving the reliability.

In accordance with the above image writing apparatus, the number of terminals for supplying the voltage to the image display medium can be minimized, thus realizing the compactness.

BRIEF DESCRIPTION OF THE DRAWINGS

FIG. 1A is a perspective view showing the entire configuration and FIG. 1B is a sectional view taken in line A-A in FIG. 1A.

FIG. 4 shows the section taken in line B-B of the electronic paper shown in FIG. 3.

FIG. 5 is a block diagram showing the configuration of the control unit of an image writing apparatus according to the first embodiment of this invention.

FIG. 9 is an electronic paper and an image writing apparatus according to a third embodiment of this invention.

FIG. 18A is a front surface view and FIG. 18B is a rear surface view.

FIG. 20A is a front surface view and FIG. 20B is a sectional view taken in line D-D in FIG. 20A.

FIGS. 21A to 21C are sectional views showing the layer configuration of the electronic paper shown in FIG. 20.

DESCRIPTION OF THE PREFERRED EMBODIMENTS

Embodiment 1

(Entire Configuration)

Figure 1A:
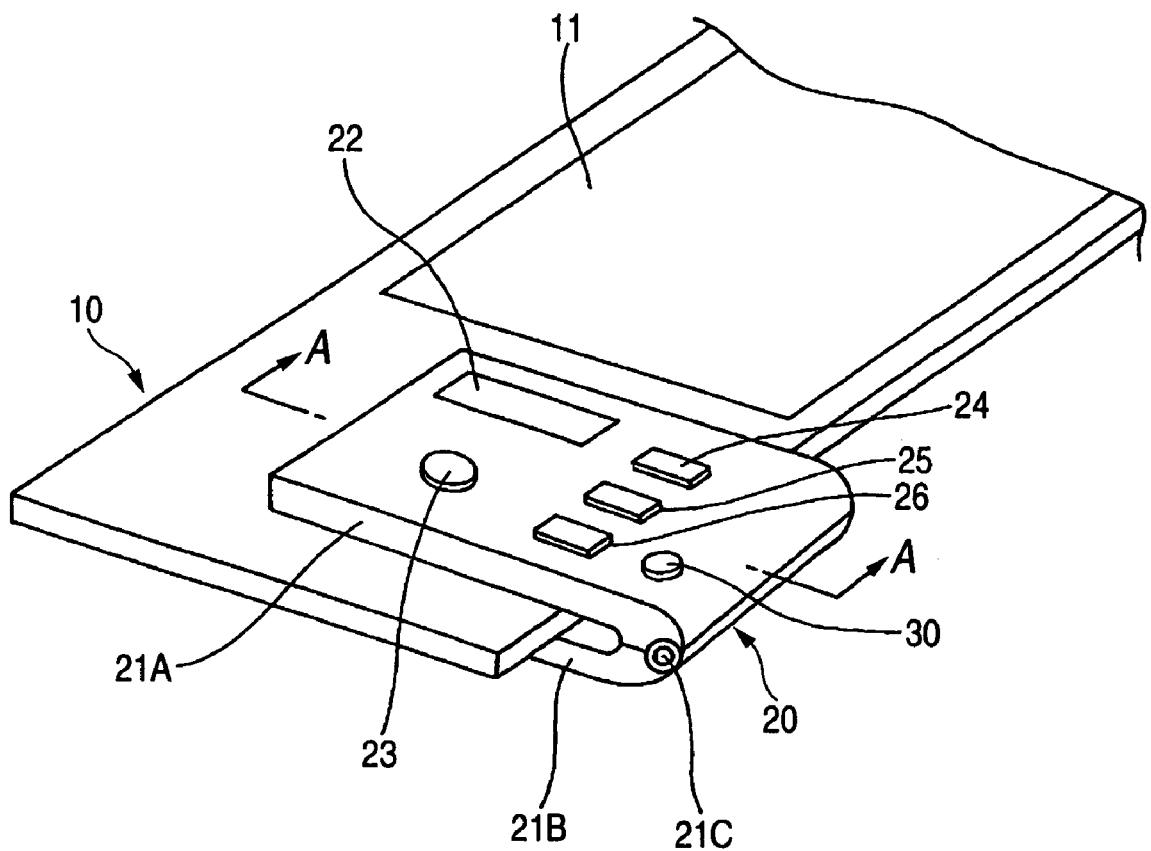
FIGS. 1A and 1B show an electronic paper and an image writing apparatus according to a first embodiment of this invention.
Figure 1B:
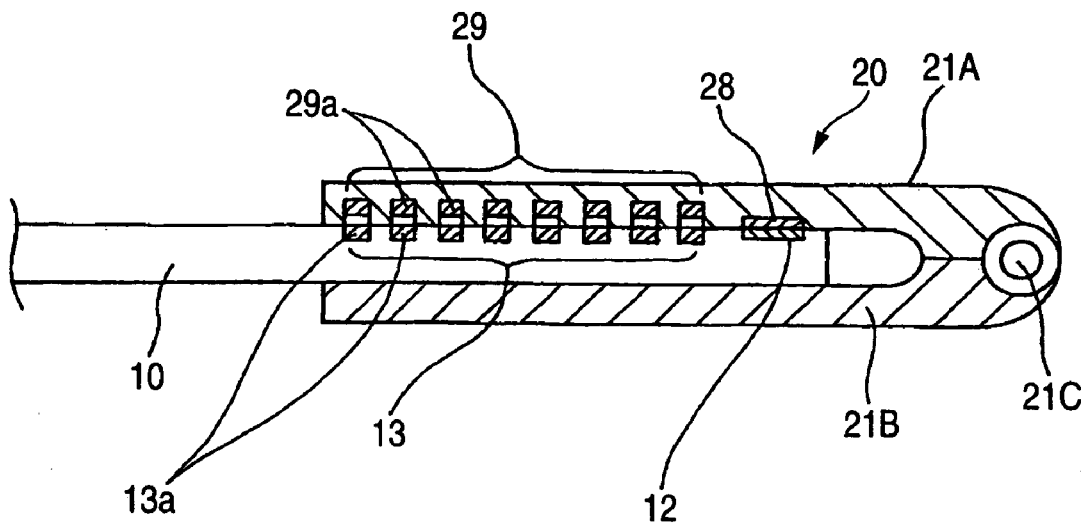
Figure 2:
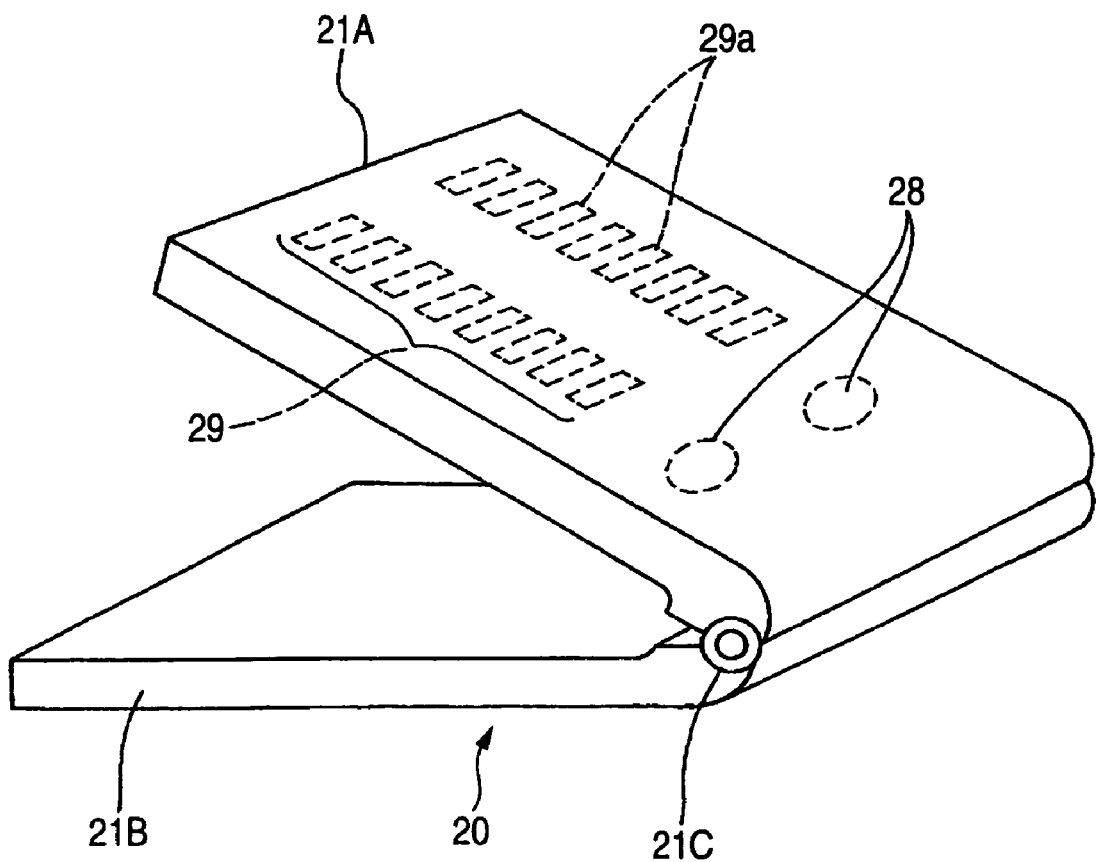
FIG. 2 is a perspective view of the image writing apparatus shown in FIGS. 1A and 1B in its opened state.

FIGS. 1A and 1B show an electronic paper and an image writing apparatus according to the first embodiment of this invention; FIG. 1A shows the entire configuration and FIG. 1B shows the section taken in line A-A in FIG. 1A. FIG. 2 is a perspective view of the image writing apparatus in its opened state.

An electronic paper 10 serving as an image display medium has a thin square shape and is made flexible. The electronic paper 10 is provided with a display unit 11 having a memory characteristic. Further, as seen from FIG. 1B, the electronic paper 1, on its surface, is provided with a pair of power receiving electrodes 12 serving as input terminals and a light receiving array 13 for photoelectric conversion including light receiving elements 13a serving as functional elements whose number corresponds the number (here, 16) of input signals.

An image writing apparatus 20 for writing an image on the electronic paper 10 is designed to be detachably mountable at a predetermined position of the electronic paper 10. The image writing apparatus 10 is also designed to supply power and transmit a driving signal by light to the electronic paper 10.

Further, the image writing apparatus 20 includes an upper body 21A, a lower body 21B and a hinge 21C for openably coupling these bodies. The upper body 21A includes a liquid crystal display (LCD) 22 for displaying a title and others, a power button 23 for turning on/off power, an UP key 24 for upward scroll, a DOWN key 25 for downward scroll, a print key 26 for starting write onto the electronic paper 10 and an ENTER key 30 for inputting an instruction such as confirmation.

Further, the image writing apparatus 20, as seen from FIG. 1B and FIG. 2, on the inner surface of the upper body 21A, is provided with a pair of power supply terminals 28 with swelling surfaces or convex portions serving as output terminals which are contactable with the power receiving electrodes 12, and an LED array 29 including LEDs (light emitting diodes) serving as driving signal generating elements, whose number is equal to that of the light receiving elements 13a of the light receiving array 13. The power supply terminals 28 and the LED array 29 are located at the positions corresponding to those of the power receiving electrodes 12 and light receiving element array 13 of the electronic paper 10. Incidentally, FIG. 2 does not show the liquid crystal display 22, power button 23, UP key 24, DOWN key 25 and print key 26 shown in FIG. 1.

Figure 3:
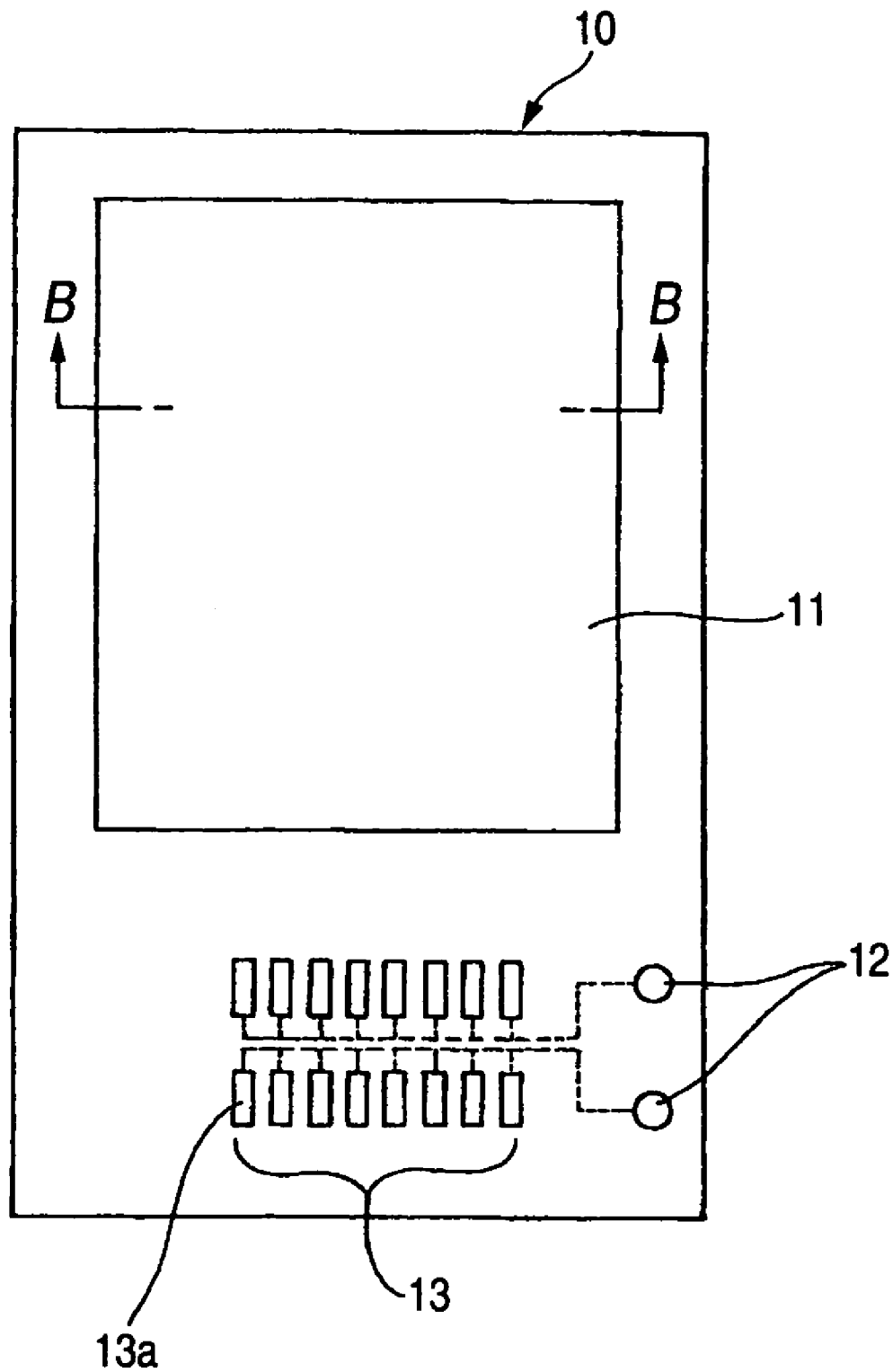
FIG. 3 is a plan view of the entire configuration of the electronic paper shown in FIGS. 1A and 1B.

FIG. 3 shows the entire configuration of the electronic paper 10. The electronic paper 10, on its surface, is provided with the light receiving element array 13 contiguous to the display unit 11. The pair of power receiving electrodes 12 are located to be contiguous to the light receiving element array 13. The light receiving elements 13a are photo-conductors, but may be photo-converting elements such as photodiodes or phototransistors. The light receiving elements 13a, now sixteen light receiving elements are arranged in two columns. The one terminals of the respective light receiving elements 13a are connected to the power receiving electrodes 12 whereas the other terminals thereof are connected to row electrodes and column electrode incorporated in the electronic paper 10.

Figure 4A:
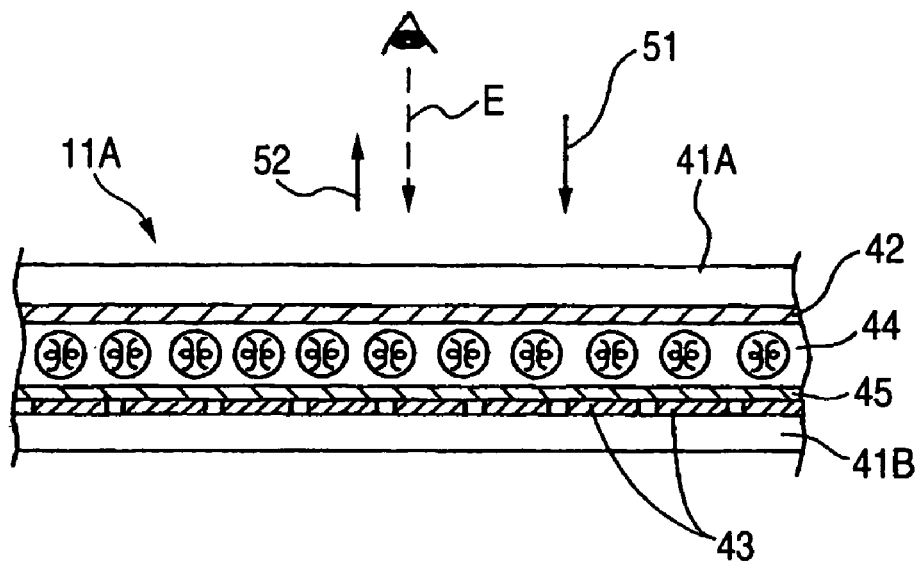
FIG. 4A is a sectional view of a layer configuration of the display unit of the electronic paper.
Figure 4B:
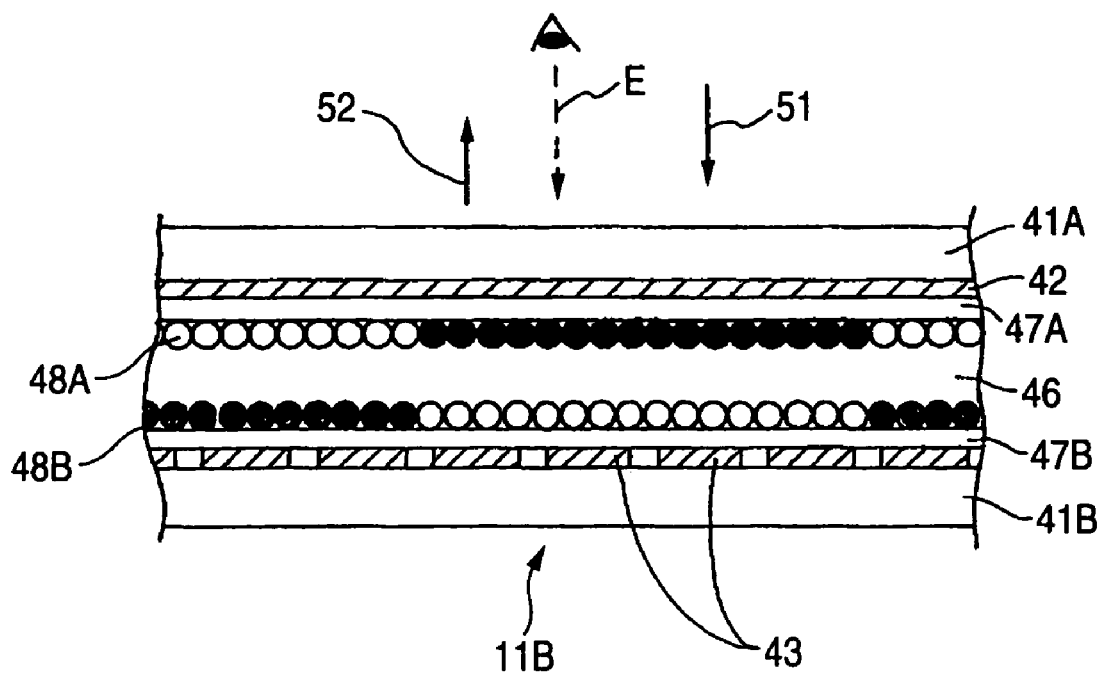
FIG. 4B is a sectional view of another layer configuration thereof.

FIG. 4 shows the section taken in line B-B of the electronic paper shown in FIG. 3. FIG. 4A shows the layer configuration of the display unit of the electronic paper, and FIG. 4B shows another layer configuration thereof.

(First Layer Configuration of the Display Unit)

The display unit 11A shown in FIG. 4A is made of a flexible PET (polyethylene terephthalate). The display unit 11A includes a pair of transparent substrates 41A, 41B located apart by a predetermined interval from each other; row electrodes 42 of ITO (indium tin oxide) formed inside the substrate 41A; column electrodes 43 of ITO formed inside the substrate 41B; a liquid crystal layer 44 of liquid crystal having a memory characteristic, e.g. cholesteric liquid crystal; and a light absorption layer 45 arranged between the liquid crystal layer 44 and column electrodes 43. The plurality of row electrode 42 and the plurality of column electrodes 43 are arranged in a matrix shape.

(Second Layer Configuration of the Display Unit)

The display unit 11B shown in FIG. 4B has a configuration in which a space area 46 is located in place of the liquid crystal layer 44 in the display unit 11A shown in FIG. 4A; white particles 48A and black particles 48B are sealed in the space area 46; and for protection of the row electrodes 43 and stabilization of the charging characteristic of the white particles 48A and black particles 48B, dielectric layers 47A, 47B of polycarbonate, polyester, polyimide, epoxy are arranged inside the row electrodes 42 and column electrodes 43. Incidentally, a partitioning member for partitioning the space area 46 in parallel to the substrates for every one or every plurality of pixels.

The white particles 48A can be obtained for example by adding 0.4 weight part of fine powder of isopropyl-trimethoxy-silane treated titania to 100 weight part of spherical fine particles of crosslinking polymethyl methacrylate containing titanium oxide having a volume average particle diameter of 20 μm. The black particles 48B may be spherical fine particles of crosslinking polymethyl methacrylate containing carbon having a volume average particle diameter of 20 μm.

(Writing Operation into the Display Unit)

Where write into the display unit 11A shown in FIG. 4A is carried out, a predetermined voltage is applied to a row electrode 42 and a column electrode 43 crossing at the pixel segment corresponding to an image data. The voltage-applied area of the liquid crystal layer 44, to which a voltage exceeding a predetermined or larger threshold value is applied, holds a status with a great light reflectance. Thus, when the display unit 11A is seen from line of sight E, in the voltage applied area, the light reflected from the liquid crystal layer 44 under illumination light 51 is seen as white display light 52. Inversely, the voltage not-applied area of the liquid crystal layer 44 holds the state permitting light transmission. Since the light having passed the liquid crystal layer 44 is absorbed by the light absorption layer 45, when the image display medium 40A is seen from line of sight E, the pertinent area is seen black. In this way, two-color image display by black and white is carried out.

Where write into the display unit 11B shown in FIG. 4B is carried out, like the display unit 11A shown in FIG. 4A, a predetermined voltage is applied to a row electrode 42 and a column electrode 43 crossing at the pixel segment corresponding to an image data. The voltage is applied, for example, in such a manner that 0 V is applied to the row electrode 42 and a positive or negative image voltage of e.g. +140 V or −140 V is applied for a predetermined time (e.g. 30 ms) corresponding to the image data.

The white particles 48A and black particles 48B are charged with different polarities by frictional charging by mutual friction. For example, if the white particles 48A are charged with a negative polarity, the black particles 48B are charged with a positive polarity. As shown in FIG. 4B, the white particles 48A charged with the negative polarity move toward the positive-voltage applied column electrodes 43 to be applied to the inner face of the column electrodes 43, whereas the black particles 48B charged with the positive polarity are applied to the inner face of the row electrodes 42. In this way, the monochromatic image constituted by the white particles 48A and black particles 48B applied to the inner face of the row electrodes 42 is displayed through the substrate 41A.

Even when application of the voltage is stopped to the row electrodes 42 and column electrodes 43, the electrostatic application force between the white particles 48A, black particles 48B and the dielectric layers 47A, 47B is held. So the particles 48A, 48B are held as they are applied to the inner face of the dielectric layers 47A, 47B. Thus, the monochromatic image can be displayed for a long time.

(Configuration of the Control Unit in the Image Writing Apparatus)

FIG. 5 shows the configuration of the control unit in the image writing apparatus 20. A control unit 60 includes a CPU 61 for controlling the entire image writing apparatus 20, a ROM in which a program for operating the CPU 61 is stored, a RAM 63 in which a processing result and other are temporarily stored, an image data storage unit 64 in which the image data are stored, a wireless unit 65 provided with a transmission/reception circuit for performing communication with the exterior by wireless and acquiring the image data from the exterior, an antenna 66 connected to the wireless unit 65, a driving unit 67 for driving the LED array 29 on the basis of the image data under the control of the CPU 61, a voltage generating unit 68 for supplying a predetermined voltage to the power supply terminals 28 and a battery 69 which is power for each of the circuits. Further, the CPU 61 is connected with the power button 23, keys 24, 25, 26, 30 and liquid crystal display 22. When the user operates any one of them, the CPU 61 recognizes the on-operation.

(Internal Wiring Configuration of the Electronic Paper)

Figure 6:
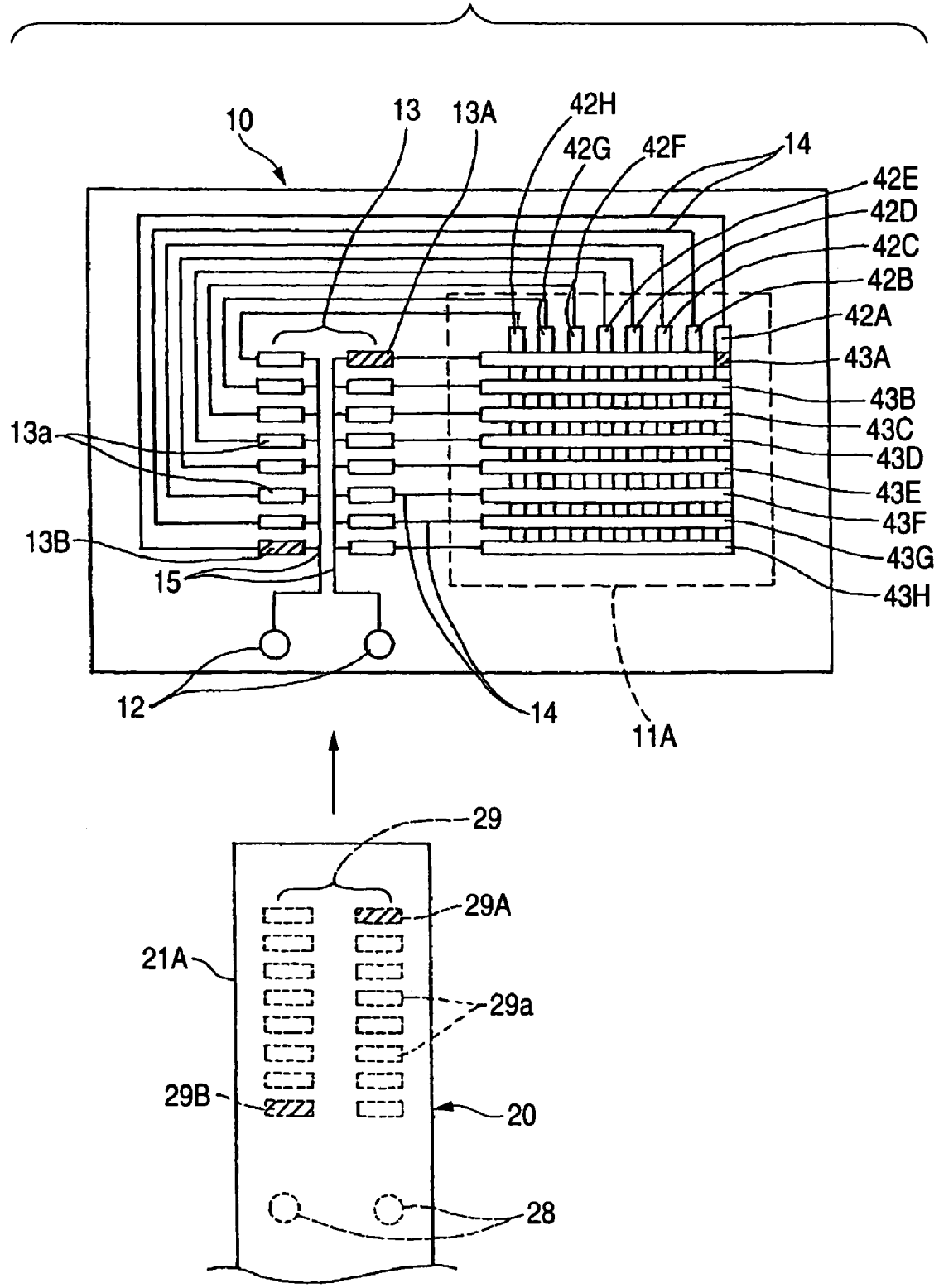
FIG. 6 is a connection view showing the internal wirings in the electronic paper and image writing apparatus according to the first embodiment of this invention.

FIG. 6 shows the inner wiring of the electronic paper 10. The electronic paper 10 incorporates the display unit 11A shown in e.g. FIG. 4A, but now, only the row electrodes 42 and column electrodes 43 are shown. The row electrodes 42 and the column electrodes 43 include a plurality of electrodes (42A to 42H and 43A to 43H) arranged in the matrix shape.

The row electrodes 42 and column electrodes 43 are connected to the output sides of the light receiving elements 13a through wiring patterns 14. The respective input sides of the light receiving elements 13a of the light receiving element array 13 are connected to the power receiving terminals 12 through wiring patterns 15.

(Operation of the Image Writing Operation)

Now referring to FIGS. 1 to 6, an explanation will be given of the display operation according to the first embodiment. Where the image has been already written on the electronic paper 10, because the display unit 11A of the electronic paper 10 has a memory characteristic, as long as there is external light even if the power is not present, the recorded image can be seen.

Where the image is newly written on the electronic paper 10, with the upper body 21A directed upward, the image writing apparatus 20 is opened at a suitable angle. In this state, the image writing apparatus is horizontally put over the electronic paper 10. Thereafter, the image writing apparatus 20 is brought into intimate contact with the electronic paper 10 so that it sandwich the electronic paper 10 from above and below. At this time, the upper body 21A is positioned so that the power supplying terminals 28 and LED array 29 are superposed on the power receiving terminals 12 and light receiving element array 13 of the electronic paper 10, respectively. Thus, the power supplying terminals 28 are brought into contact with the power receiving electrodes 12, and the light receiving element array 13 are arranged to be opposite to the LED array 29.

When the power button 23 is depressed, the CPU 61 displays a menu on the liquid crystal display 22. The menu includes titles of image data stored in the image data storage unit 64, items which can be set by the user and items such as a battery remaining quantity. Where displaying of the image data stored in the image data storage unit 64 is attempted, the user operates the UP key 24 or DOWN key 25 to display and designate a desired item in the menu, and thereafter depresses the ENTER key 30.

By this operation, the CPU 61 drives the voltage generating unit 68 to apply a predetermined voltage to the power supplying terminals 28 and reads the pertinent image data from the image data storage unit 64. Further, the CPU 61 drives the LED array 29 according to the image through the driving unit 67 so that the LEDs 29a generate an optical signal. The optical signal is incident on the light receiving element array 13. When light exceeding a certain level is incident, the respective light receiving elements 13a of the light receiving element array 13 perform their switching operation, i.e. reduce their resistance to be conductive between both ends, thereby supplying the voltage applied to the power receiving electrodes 12 to the electrodes 42, 43 of the display unit 11A. Thus, the display according to the image data is made on the display unit 11A.

Where control is made so that e.g. LEDs 29A, 29B diagonally shaded in the LED array 29 of the image writing apparatus 20 in FIG. 6 emit light, the light is incident on the light receiving elements 13A, 13B diagonally shaded in FIG. 6. The light receiving elements 13A, 13B perform the switching operation owing to the incident light to become their on state. The other light receiving elements than the light receiving elements 13A, 13B remain their off state because the light is not incident thereon. When the light receiving elements 13A, 13B are turned on, the voltage applied to the power receiving electrodes 12 is applied to the row electrode 42A and column electrode 43A through the wiring patterns 15, 14. Thus, the voltage is applied to a portion of the liquid crystal layer 44 corresponding to the pixel segment (area diagonally shaded in FIG. 6) formed when the row electrode 42A and the column electrode 43A cross each other, thereby partially forming a reflecting area to make the display so that this area is seen white and the remaining area is seen black. In the procedure described above, the LEDs 29a are successively lit and the voltage is successively applied to the row electrodes 42 and column electrodes 43 so that the image will be displayed on the entire display unit 11A.

(Advantages of the First Embodiment)

According to the first embodiment, the following advantages can be obtained.

(I) With the number of terminals to be supplied with the voltage being minimized, the driving signal from the image writing apparatus 20 is transmitted by wireless without using contacts and using the LED array 29 and light receiving element array 13, contact failure can be reduced, thereby improving the reliability.

(II) The number of elements in the LED array 29 and light receiving element array 13 and the number of wiring patterns 14 may be provided not according to the number of pixels but according to the number of row and column electrodes. So the number of signals to be transferred can be minimized, thereby realizing cost reduction, compactness and flexibility of the electronic paper 10 and image writing apparatus 20.

(III) The display unit 11 of the electronic paper 10 has a memory characteristic and externally supplied with power so that it does not require the battery. Further, it is not necessary to mount the IC for driving, thereby realizing cost reduction, compactness and flexibility of the electronic paper 10. Incidentally, even when the IC for driving is employed as described later, the cost reduction, compactness and flexibility can be realized.

(IV) The LED array 29 and light receiving element array 13 can be formed on the substrate by the method for fabricating semiconductor devices. So their mass production can be performed, thereby realizing the cost reduction, compactness and improvement of reliability of the electronic paper 10 and image writing apparatus 20.

(V) The display unit 11A and light receiving element array 13 are arranged to not overlap with each other. So the low-profiling and flexibility of the electronic paper 10 can be realized.

Embodiment 2

Figure 7:
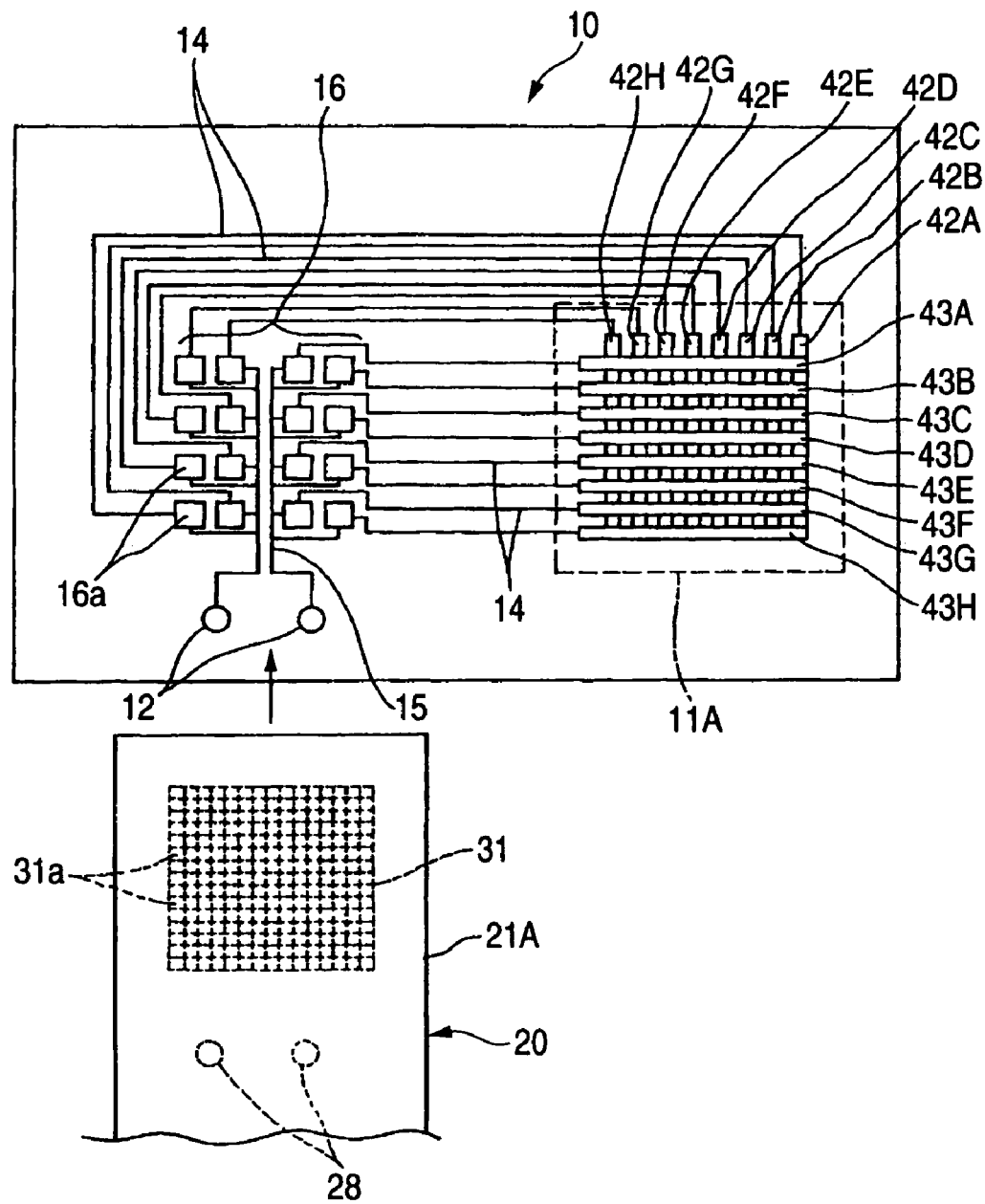
FIG. 7 is a connection view showing the electronic paper and image writing apparatus according to the second embodiment of this invention.

FIG. 7 shows the image display medium and image writing apparatus according to the second embodiment. The image writing apparatus 20 according to this embodiment has a structure in which a matrix display unit 31 constructed of a liquid crystal display is provided on the upper body 21A in place of the LED array 29 in the first embodiment, and the electronic paper 10 according to this embodiment has a structure in which a matrix light receiving area 16 including a plurality of light receiving elements 16a arranged in a matrix shape is provided in place of the light receiving element array 13 in the first embodiment. The remaining structure according to this embodiment is the same as that of the first embodiment.

The matrix display unit 16 consists of 16 light receiving elements 16a of e.g. photo-diodes (PDs) arranged in the matrix shape, and has a size equal to or smaller that the display region of the matrix display unit 31.

Incidentally, the matrix display unit 31 may be other displays such as an EL (Electroluminescence) display, an LED display and a plasma display.

The matrix display unit 31 consists of a large number of pixels arranged in the matrix shape. A plurality of pixels 31*a* are arranged oppositely to a single light receiving element 16*a* of the matrix light receiving area 16. Further, the matrix display unit 31 may be a liquid crystal display used for a mobile terminal such as a cellular phone or PHS (Personal Handyphone System).

(Operation of the Second Embodiment)

Figure 8:
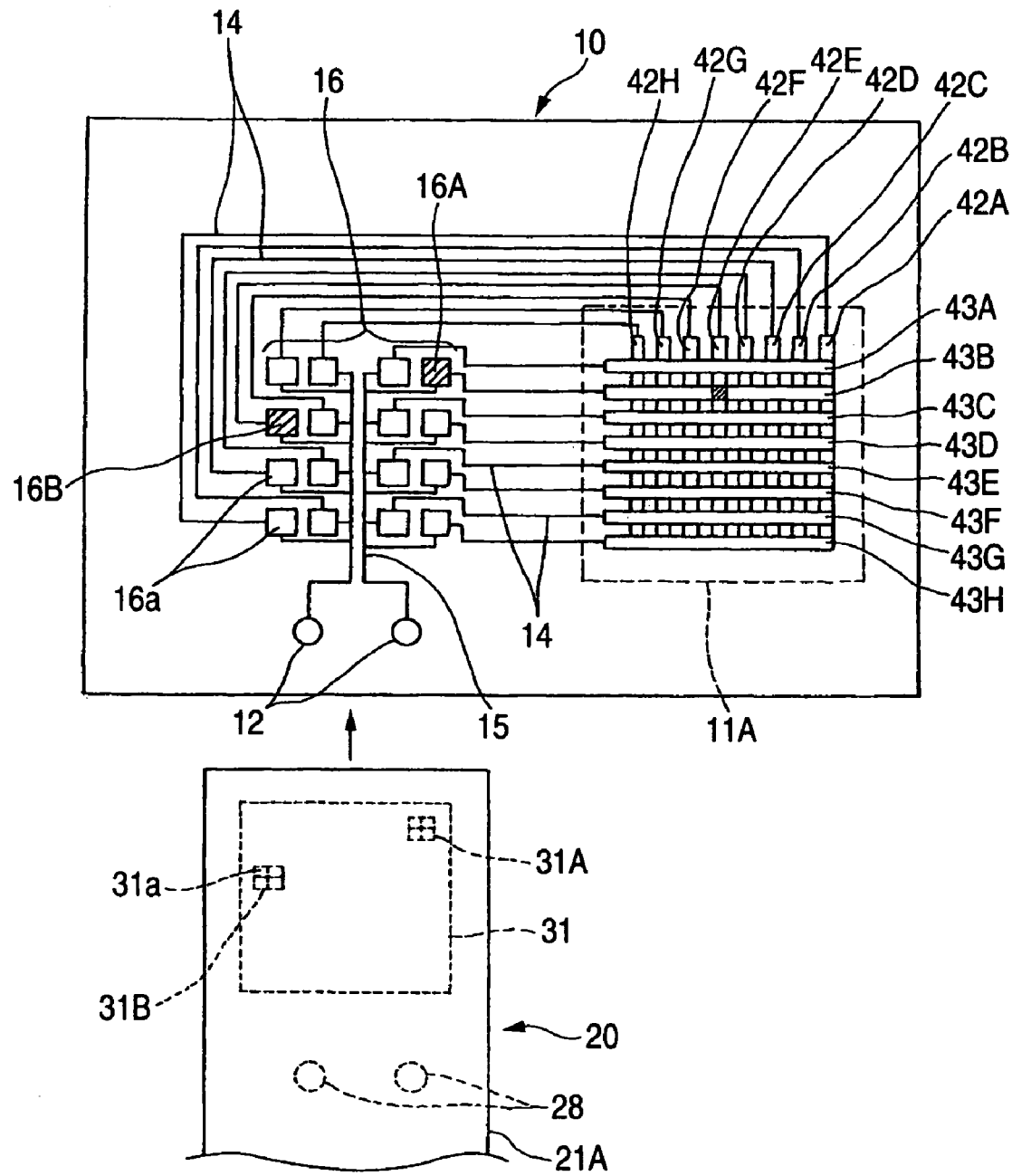
FIG. 8 is a view for explaining the operation of the electronic paper and image writing apparatus according to the second embodiment.

FIG. 8 shows the operation of the electronic paper and image writing apparatus shown in FIG. 7. The image writing apparatus 20 is positioned for the electronic paper 10 so that the matrix display unit 31 is superposed on the matrix light receiving area 16, thereby permitting write of the image. The matrix display unit 31 is operated in such a manner that 16 display segments each including a plurality (e.g. four) of pixels.

Now it is assumed that for example, two display segments 31A, 31B diagonally shaded in the matrix display unit 31 of the image writing apparatus 20 are displayed with high brightness and the remaining segments are not displayed or displayed black. In the matrix display of the electronic paper 10, the light from the display segments 31A, 31B is incident on the light receiving elements 16A, 16B diagonally shaded which are opposite to the display segments 31A, 31B of the matrix display unit 31 so that these light receiving elements 16A, 16B are turned on. The other light receiving elements 16*a* than the light receiving elements 16A, 16B remain their off state because the light is not incident thereon. When these light receiving elements 16A, 16B are turned on, the voltage applied to the power receiving electrodes 12 from the image writing apparatus 20 is applied to a row electrode 42E and a column electrode 43B. Thus, the voltage is applied to a portion of the liquid crystal layer 44 corresponding to the pixel segment (area diagonally shaded in FIG. 8) formed when the row electrode 42E and the column electrode 43B cross each other, thereby partially forming a reflecting area to make the display so that this area is seen white and the remaining area is seen black. In the procedure described above, the display segments of the matrix display unit 31 are successively lit and the voltage is successively applied to the row electrodes 42 and column electrodes 43 by simple matrix driving so that the image will be displayed on the entire display unit 11A.

(Advantages of the Second Embodiment)

In accordance with this second embodiment, the same advantages as in the first embodiment can be obtained. In addition, because the liquid crystal display of the mobile terminal which permits mass production and has high versatility can be used in place of the matrix display unit 31, cost reduction of the image writing apparatus 20 can be realized.

Further, by individually constructing the voltage generating unit 68 and using the liquid crystal of the mobile terminal such as the cellular phone in place of the matrix display unit 31, the individual image writing apparatus 20 can be made unnecessary. Thus, further cost reduction of the image writing apparatus 20 can be realized.

Embodiment 3

Figure 9A:
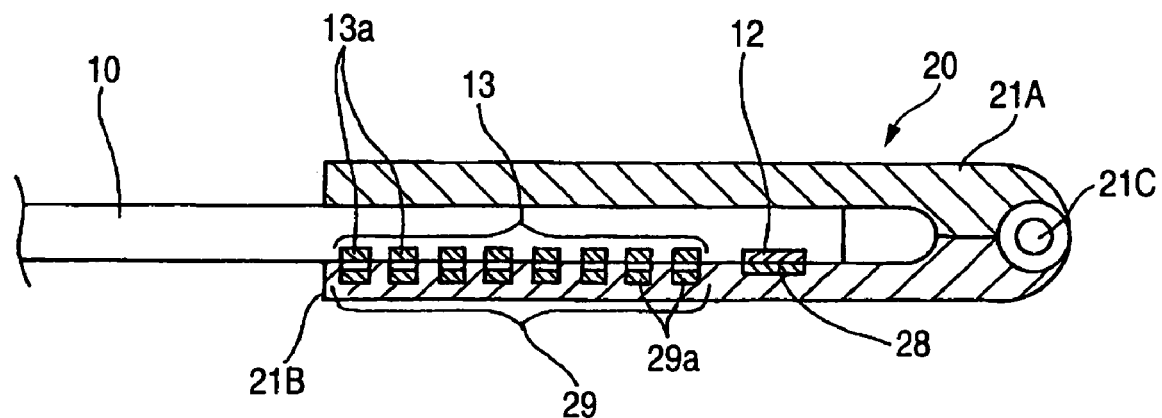
FIG. 9A is a sectional view taken in line A-A in FIG. 1A
Figure 9B:
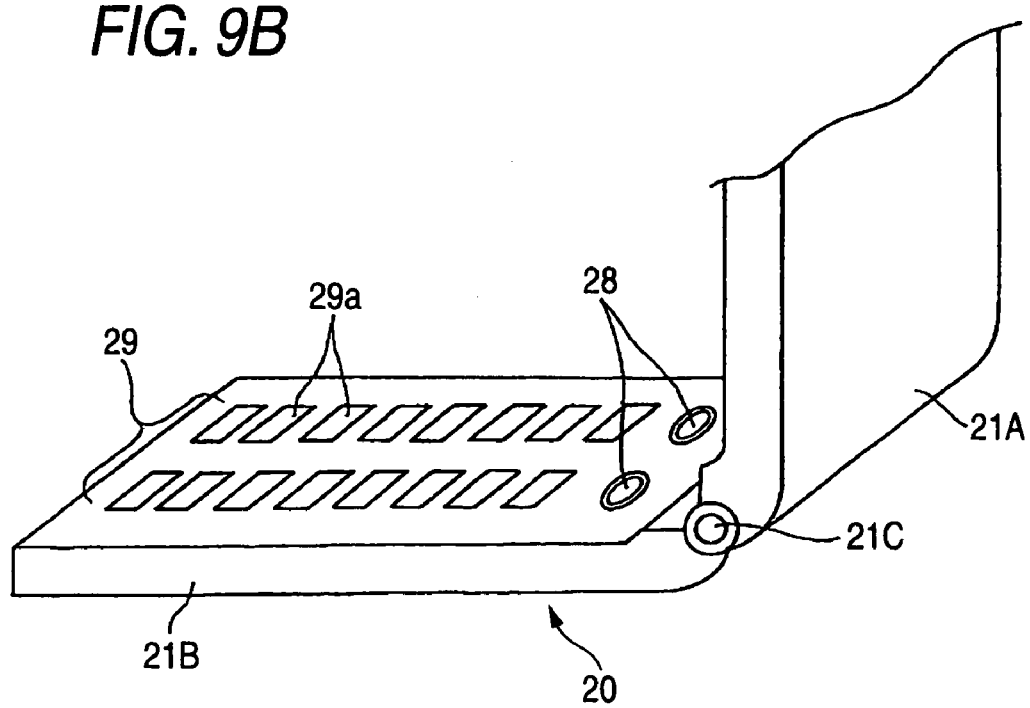
FIG. 9B is a perspective view of the image writing apparatus shown in FIG. 9A in its opened state.
Figure 10:
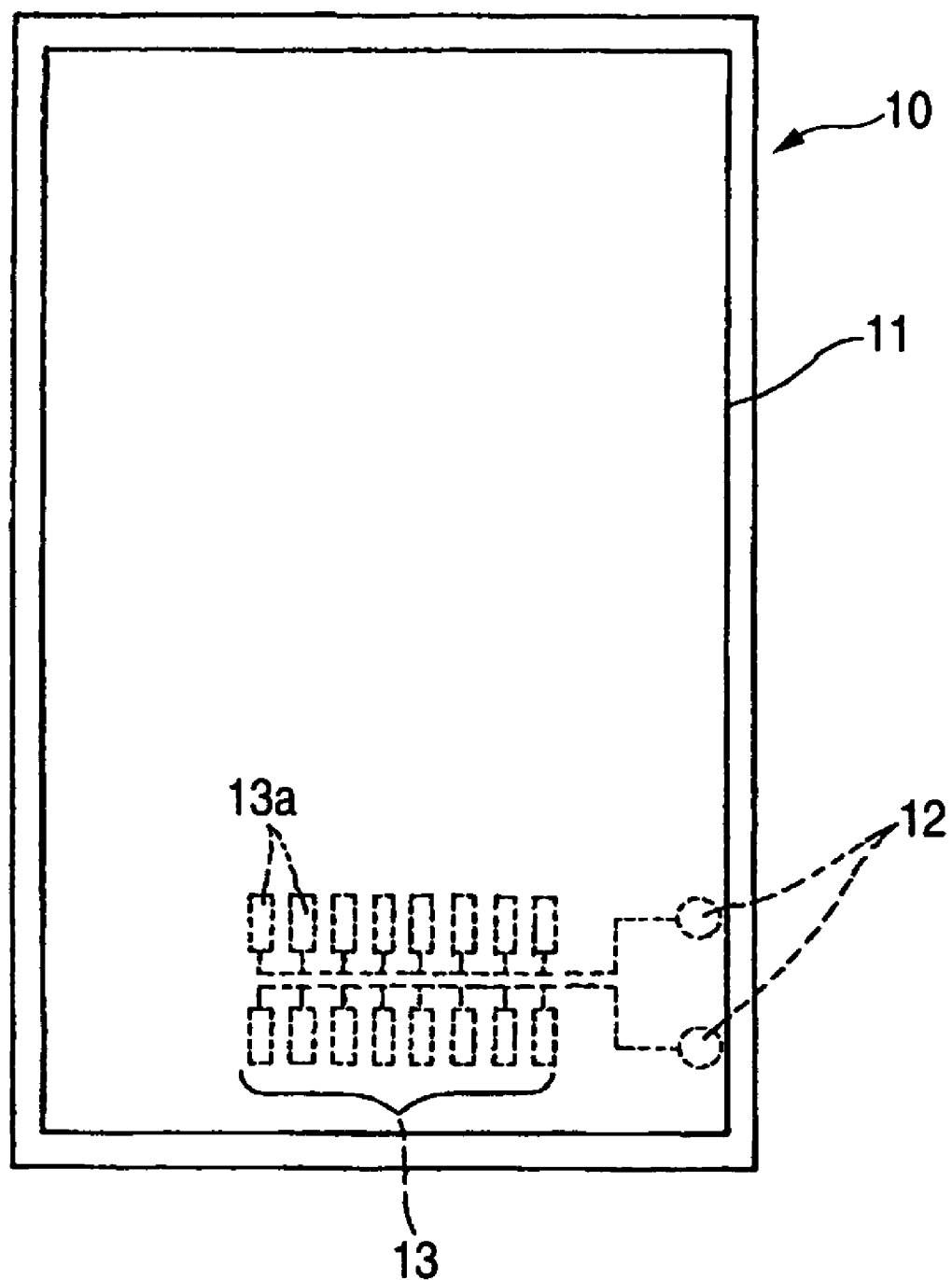
FIG. 10 is a plan view of the electronic paper shown in FIGS. 9A and 9B.

FIG. 9 shows the electronic paper and image writing apparatus according to the third embodiment of this invention. FIG. 10 shows the electronic paper according to the third embodiment. In FIG. 9, FIG. 9A is a sectional view taken in line A-A in FIG. 1A and FIG. 9B is a perspective view of the image writing apparatus shown in FIG. 9A in its opened state.

In this embodiment, the electronic paper 10 is constituted so that almost the entire region of its front surface serves as the display unit 11. As shown in FIG. 10, the power receiving electrodes 12 and light receiving element array 13 are arranged on the rear surface of the electronic paper 10.

In the image writing apparatus 20, as seen from FIG. 9B, the power supplying terminals 28 and LED array 29 are not arranged on the inner face of the upper body 21A but on the inner face of the lower body 21B. The remaining configuration is the same as the first embodiment. The operation of the third embodiment, which is the same as that of the first embodiment, will not explained here.

(Advantage of the Third Embodiment)

In accordance with the third embodiment, the same advantage as the first embodiment can be obtained. In addition, since the display unit 11 is formed on almost the entire region of the surface of the electronic paper 10, the display area can be enlarged, thereby permitting the quantity of display to be increased.

Embodiment 4

Figure 11:
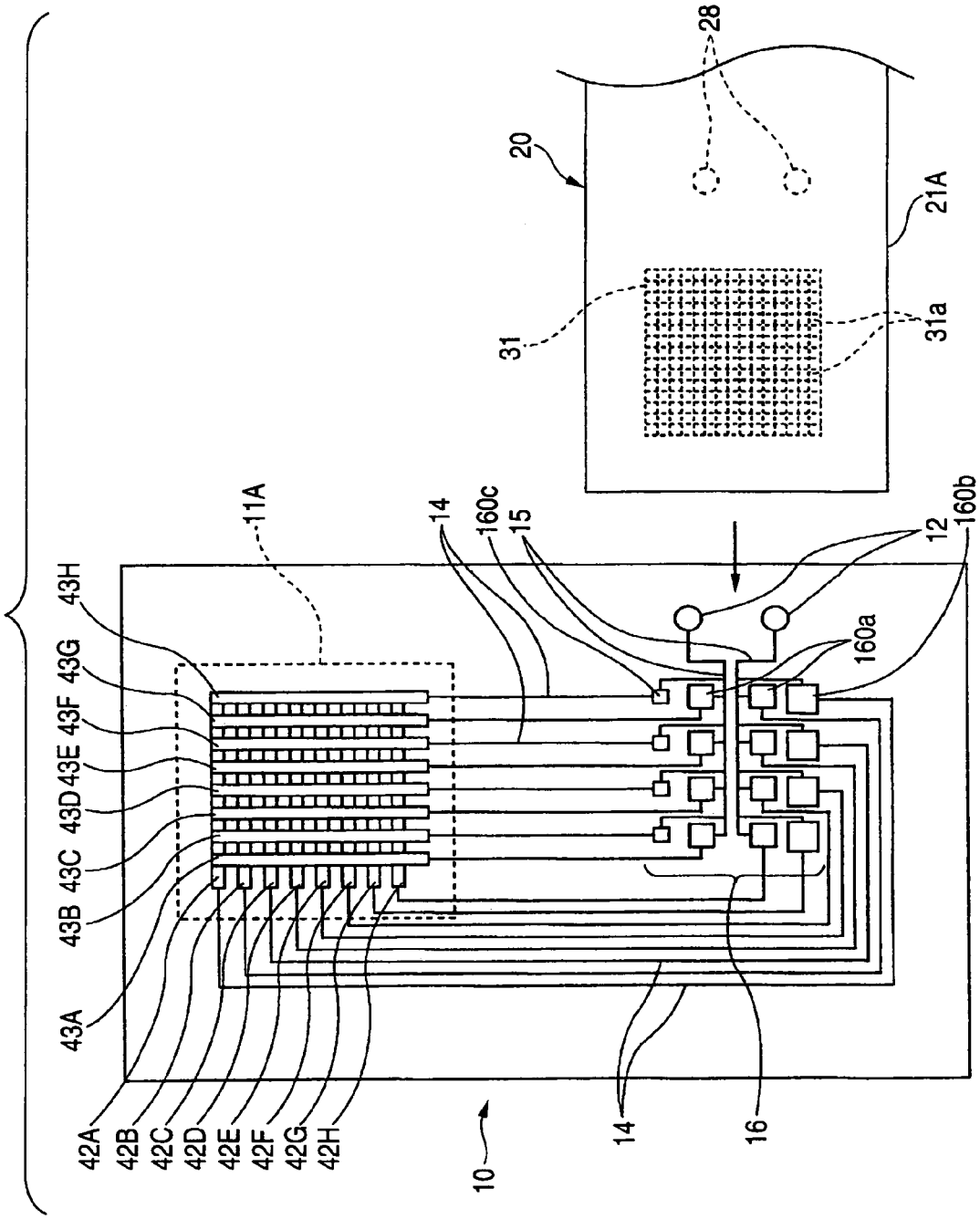
FIG. 11 is a connection view of an electronic paper and a plan view of an image writing apparatus according to the fourth embodiment of this invention.

FIG. 11 is a connection view of an electronic paper and a plan view of an image writing apparatus according to the fourth embodiment of this invention. The electronic paper 10 according to the fourth embodiment has a configuration in which in the second embodiment, the matrix light receiving unit 16 consists of square light receiving elements 160*a*, 160*b*, 160*c*, which are a plurality of kinds of photoconductors with different light receiving areas according to the lengths, i.e. wiring resistances of the wiring patterns 14, 15 from the power receiving electrodes 12 to the row electrodes 42A to 42H or column electrodes 43A to 43H. The remaining configuration is the same as that of the second embodiment.

Specifically, the light receiving elements 160*b* which are connected to row electrodes 42A, 42C, 42E, 42G and belong to the group of the wiring patterns 14, 15 with a relatively longer length have a large light receiving area. The light receiving elements 160*a* which are connected to the row electrodes 42B, 42D, 42F, 42H and column electrodes 43A, 43C, 43E, 43G and belong to the group of the wiring patterns 14, 15 with a second-longer length have an intermediate light receiving area. The light receiving elements 160*c* which are connected to the column electrodes 43B, 43D, 43F, 43H and the group of the wiring patterns 14, 15 with a relatively short length have a small light receiving area.

The matrix display unit 31 of the image writing apparatus 20 is driving-controlled so that the driving control unit not shown projects light from the display segments with the area corresponding to the light receiving area of the light receiving elements 160*a*, 160*b*, 160*c* to the light receiving elements 160*a*, 160*b*, 160*c*. For example, the light is projected from the display segment including 4×4 pixels 31*a* to the light receiving element 160*b* with the large light receiving area; the light is projected from the display segment including 3×3 pixels 31*a* to the light receiving element 160*b* with the intermediate light receiving area; the light is projected from the display segment including 2×2 pixels 31*a* to the light receiving element 160*c* with the small light receiving area.

In accordance with this fourth embodiment, the light receiving elements accompanied with the wiring patterns 14, 15 with a longer length and a larger wiring resistance receive a larger quantity of light, and hence provides a smaller resistance. Thus, even if there are variations in the wiring resistance of the wiring patterns 14, 15, variations of the voltage applied to each of the pixels of the display unit 11A can be reduced, the reducing nonuniform display.

Incidentally, the light receiving elements may have different light receiving areas. This can further reduce the nonuniform display. Further, the shape of the light receiving area of the light receiving element should not be limited to the square, but may be any shape such as a rectangle, circle and ellipse.

Embodiment 5

Figure 12:
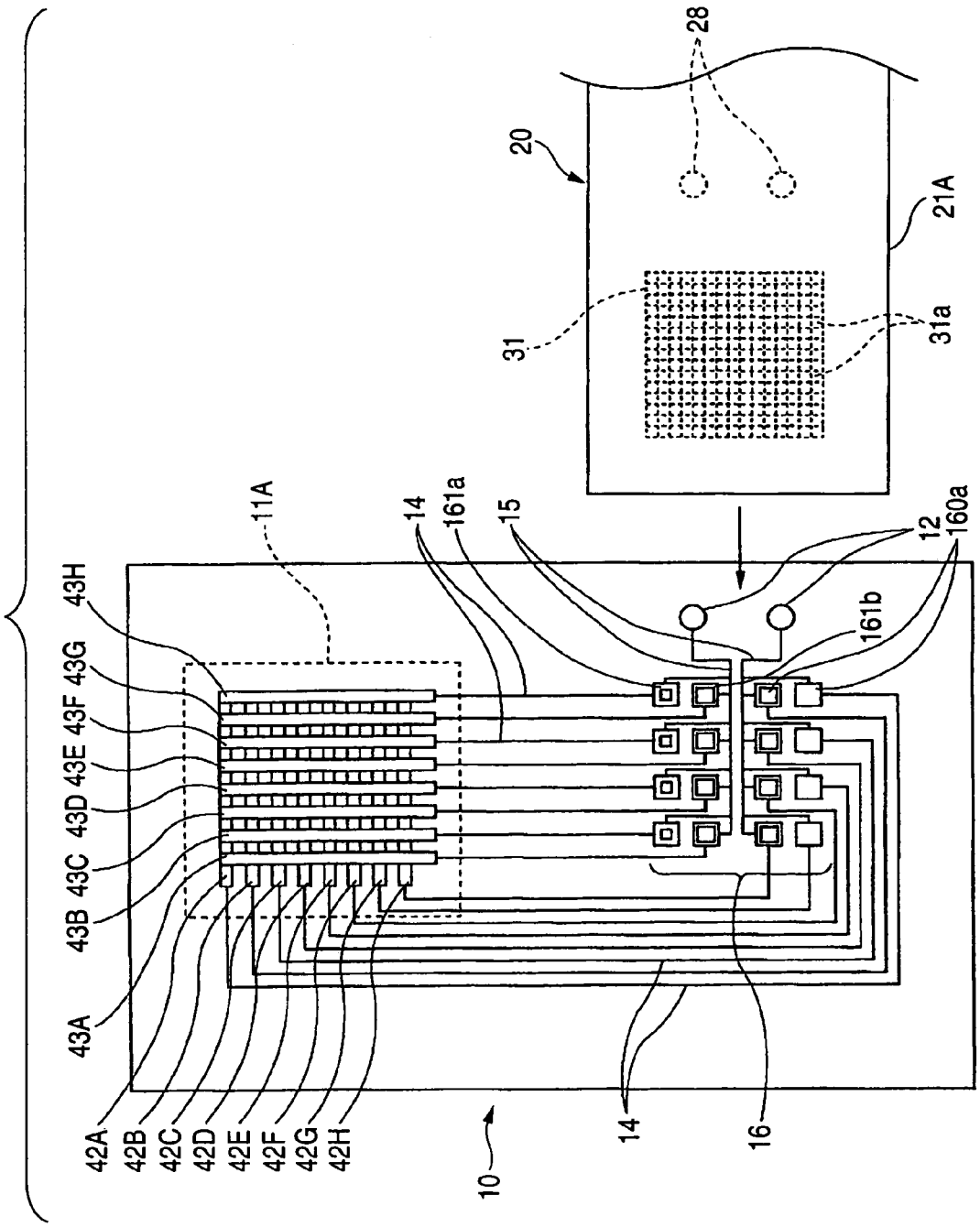
FIG. 12 is a connection view of an electronic paper and a plan view of an image writing apparatus according to the fifth embodiment of this invention.

FIG. 12 is a connection view of an electronic paper and a plan view of an image writing apparatus according to the fifth embodiment of this invention. In the electronic paper 10 according to the fifth embodiment, frame-shape masks 161a, 161b with different light-shielding areas are arranged on the light receiving elements 160a to provide light receiving areas equal to those of the light receiving elements 160a to 160c in the forth embodiment. The remaining configuration is the same as that of the fourth embodiment. Incidentally, no mask is provided on the light receiving elements 160a which are connected to the row electrodes 42A, 42C, 42E, 42G and belong to the group of the wiring patterns 14 with the long length.

In accordance with the fifth embodiment, like the fourth embodiment, even if there are variations in the wiring resistance, variations of the voltage applied to each of the pixels of the display unit 11A can be reduced, thus reducing nonuniform display. Incidentally, the mask shape should not be limited to the frame shape described above, but may be any shape with no opening, such as square. The mask may have a plurality of openings at the positions corresponding to the plurality of light receiving elements.

Embodiment 6

Figure 13:
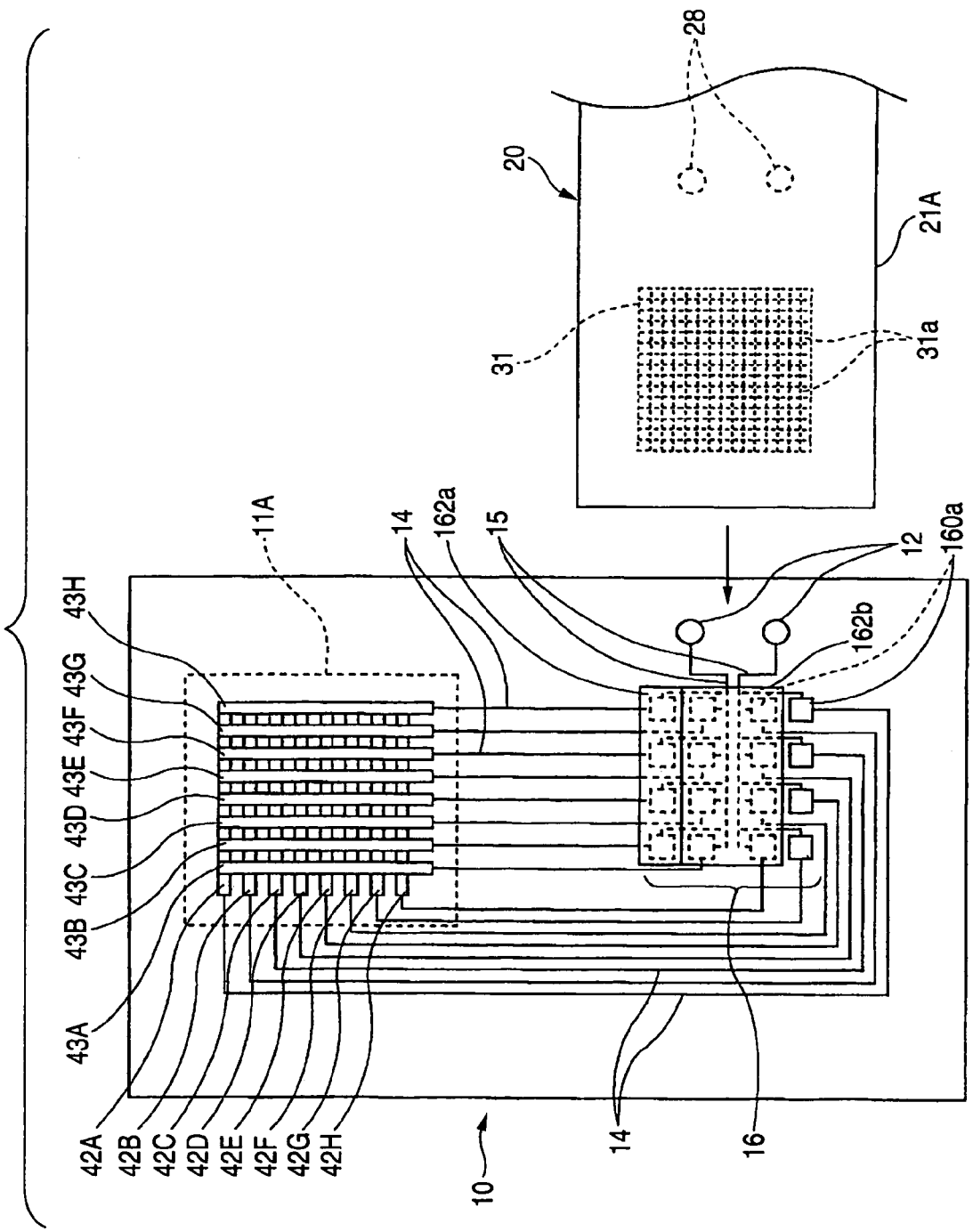
FIG. 13 is a connection view of an electronic paper and a plan view of an image writing apparatus according to the sixth embodiment of this invention.

FIG. 13 is a connection view of an electronic paper and a plan view of an image writing apparatus according to the sixth embodiment of this invention. In the electronic paper 10 according to the sixth embodiment, filters 162a, 162b with different light transmittances are arranged on the light receiving elements 160a to provide light receiving amounts equal to those of the light receiving elements 160a to 160c in the forth embodiment. The remaining configuration is the same as that of the fourth embodiment. Incidentally, no filter is provided on the light receiving elements 160a which are connected to the row electrodes 42A, 42C, 42E, 42G and belong to the group of the wiring patterns 14 with the long length. In accordance with this sixth embodiment, like the fifth embodiment, the nonuniform display can be reduced. Incidentally, filters with different light transmittances may be given to the respective light receiving elements 160a.

Embodiment 7

Figure 14:
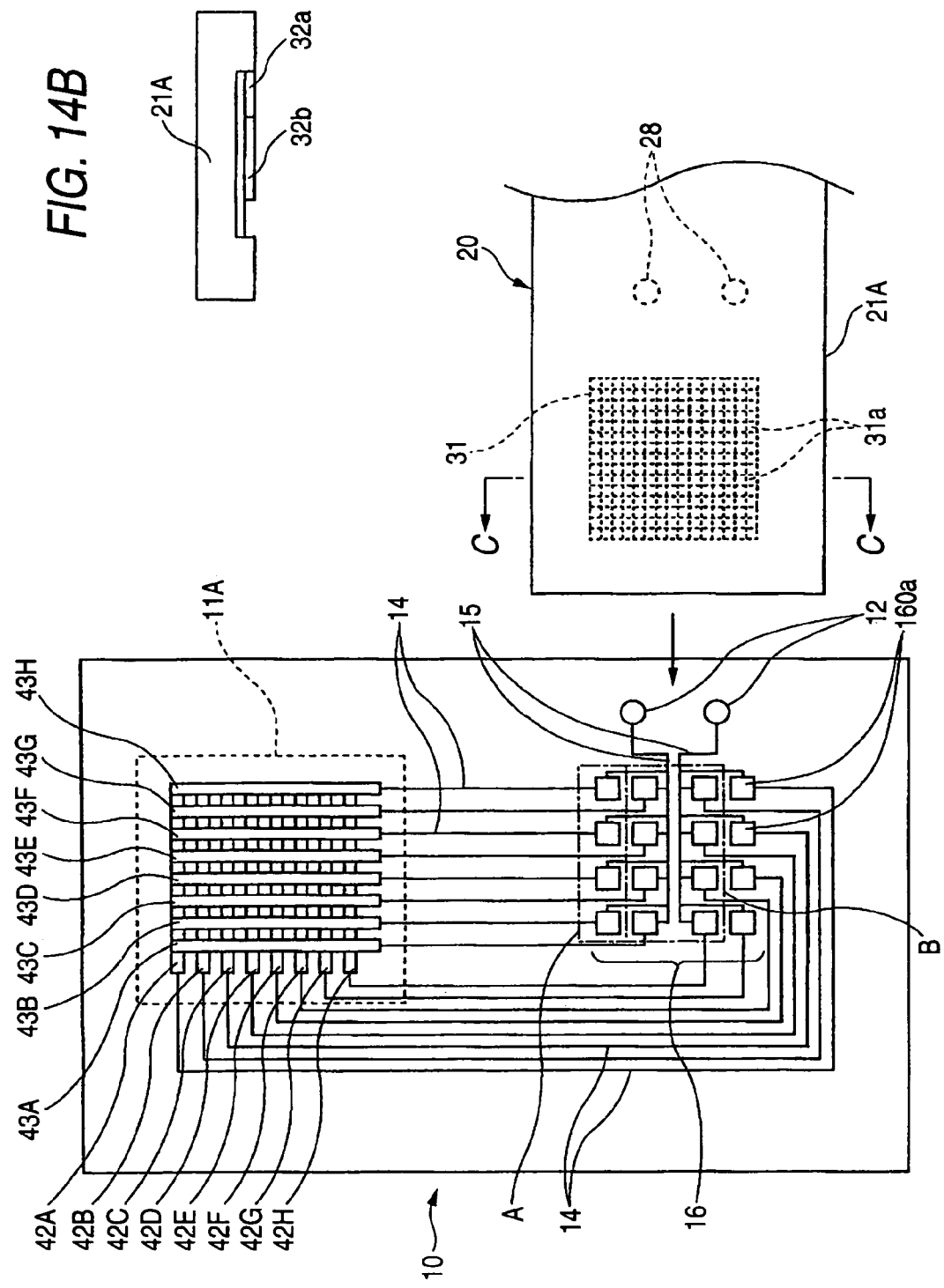
FIG. 14A is a connection view of an electronic paper and a plan view of an image writing apparatus according to the seventh embodiment of this invention.
FIG. 14B is a sectional view taken in line C-C in FIG. 14A.

FIG. 14A is a connection view of an electronic paper and a plan view of an image writing apparatus according to the seventh embodiment of this invention, and FIG. 14B is a sectional view taken in line C-C in FIG. 14A. In this seventh embodiment, in place of the filters 162a, 162b arranged on the light receiving elements 160a of the electronic paper 10, filters 32a, 32b with different light transmittances are formed on the surface of the matrix display unit 31 of the image writing apparatus 20. In FIG. 14A, the light receiving elements 160a within a region A corresponds to a filter 32a with a lower light transmittance. The light receiving elements 160a within a region B correspond to a filter 32b with a higher light transmittance. In accordance with this seventh embodiment, like the sixth embodiment, the nonuniform display can be reduced. Incidentally, filters with different light transmittances may be given to the respective display segments corresponding to the light receiving elements 160a. Further, without providing the filters 32a, 32b, the light intensity of the pixels may be controlled.

Embodiment 8

Figure 15:
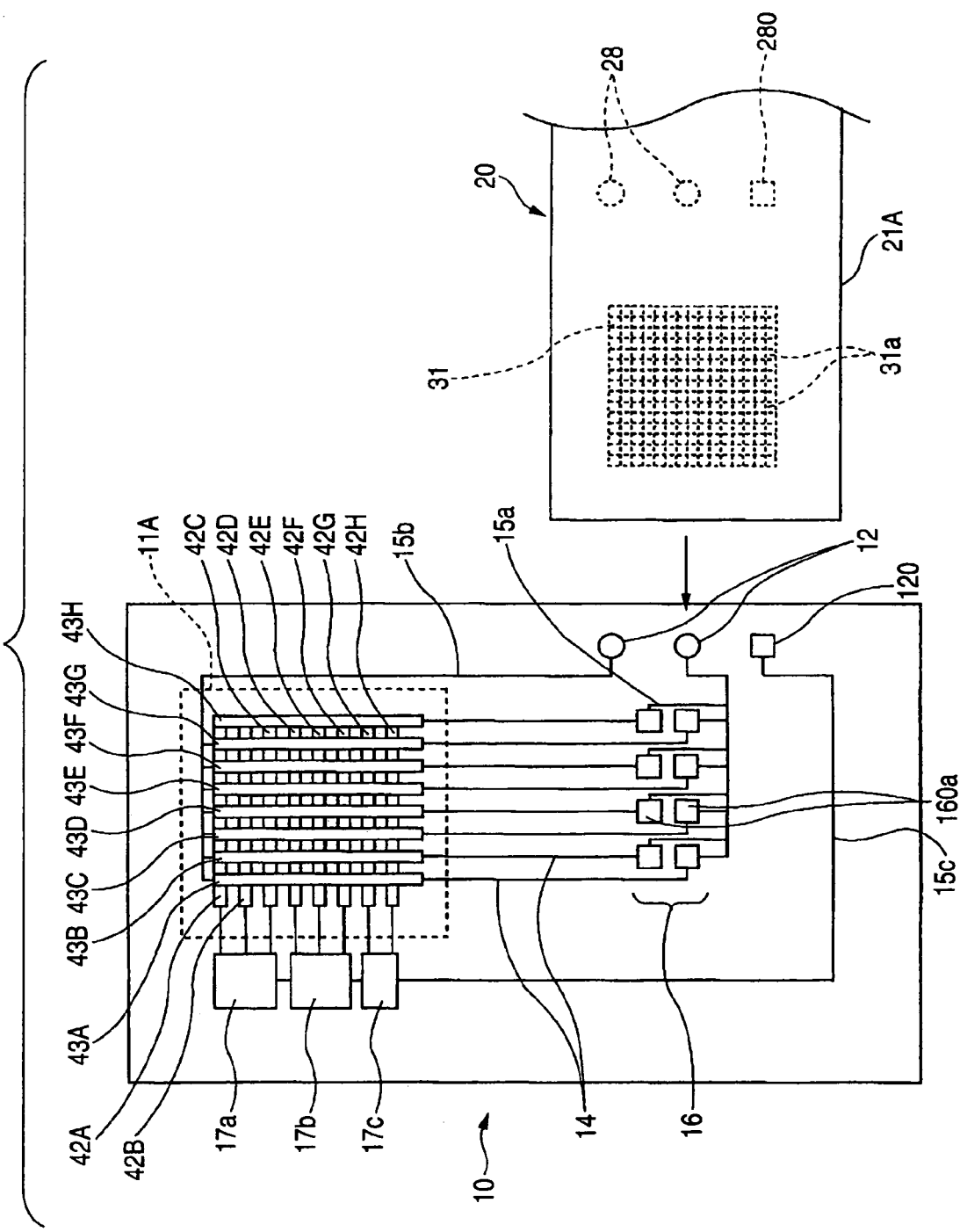
FIG. 15 is a connection view of an electronic paper and a plan view of an image writing apparatus according to the eighth embodiment of this invention.

FIG. 15 is a connection view of an electronic paper and a plan view of an image writing apparatus according to the eighth embodiment of this invention. The electronic paper 10 according to the eighth embodiment of this invention employs a scan-driving IC as a part of optical driving in the second embodiment.

This electronic paper 10 is provided with scan-driving ICs 17a, 17b, 17c for scanning the row electrodes 42A to 42H connected to the row electrodes 42A to 42H, in place of the light receiving elements 160a connected to the row electrodes 42A to 42H, and provided with a power receiving electrode 120 for supplying a control signal such as a clock and power to the scan-driving ICs 17a, 17b, 17c.

The image writing apparatus 20 according to the eighth embodiment is provided with a power supplying terminal 280 in contact with the power receiving electrode 120 in addition to the pair of power supplying terminals 28 in contact with the pair of power receiving electrodes 12 during write of the image so that the control signal and power are supplied to the scan-driving ICs 17a, 17b, 17c through the power supplying terminal 280 and power receiving electrode 120.

In accordance with the eighth embodiment, the lengths of the wiring patterns between the scan-driving ICs 17a to 17c and the row electrodes 42A to 42H can be made equal, variations in the wiring resistance are almost lost, thereby permitting the image with no nonuniform display to be displayed. The number of the light receiving elements 160a can be reduced and so the area of the matrix display unit 31 of the image writing apparatus 20 can be decreased. Incidentally, without using the scan-driving ICs 17a to 17c, a data driving IC may be employed for applying a voltage corresponding to the image data to the column electrodes 43A to 43H.

Embodiment 9

Figure 16:
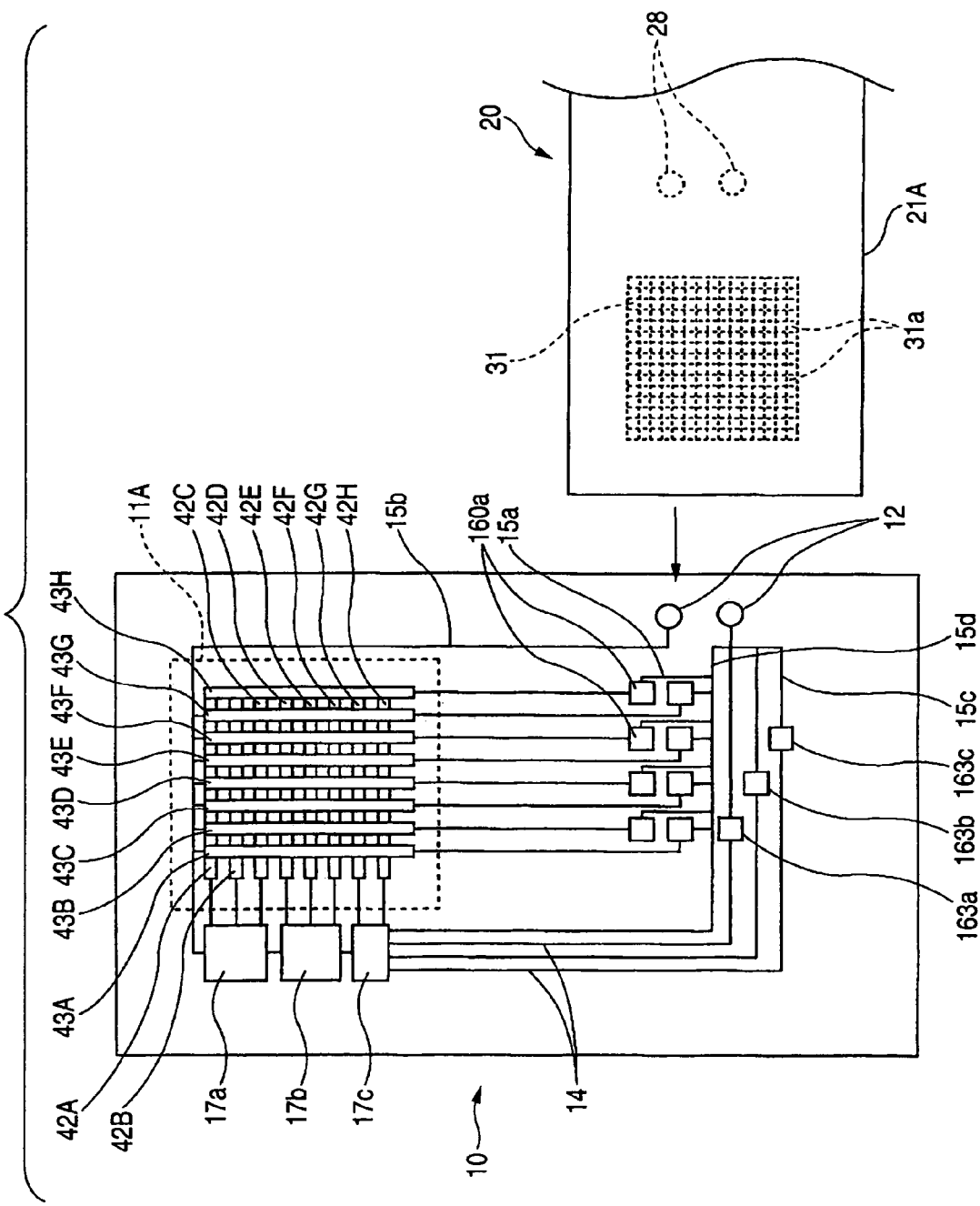
FIG. 16 is a connection view of an electronic paper and a plan view of an image writing apparatus according to the ninth embodiment of this invention.

FIG. 16 is a connection view of an electronic paper and a plan view of an image writing apparatus according to the ninth embodiment of this invention. The electronic paper 10 according to the ninth embodiment is provided with light receiving elements 163a, 163b, 163c on the wiring patterns 14 toward the scan-driving ICs 17a, 17b, 17c, but not with the power receiving electrode 120. The remaining configuration is the same as that in the eighth embodiment.

The image writing apparatus 20 according to this ninth embodiment is constructed so that during write of the image, light is projected to the light receiving elements 163a to 163c to supply the control signal to the scan-driving ICs 17a, 17b, 17c and power is supplied to the scan-driving ICs 17a, 17b, 17c through the one power receiving electrode 12 of the pair of power receiving electrodes 12.

In accordance with the ninth embodiment, as compared with the eighth embodiment, the number of the power receiving electrodes can be reduced. As compared with the second embodiment, the number of the light receiving elements can be reduced. Incidentally, without using the scan-driving ICs 17a to 17c, a data driving IC may be employed for applying a voltage corresponding to the image data to the column electrodes 43A to 43H.

Embodiment 10

Figure 17:
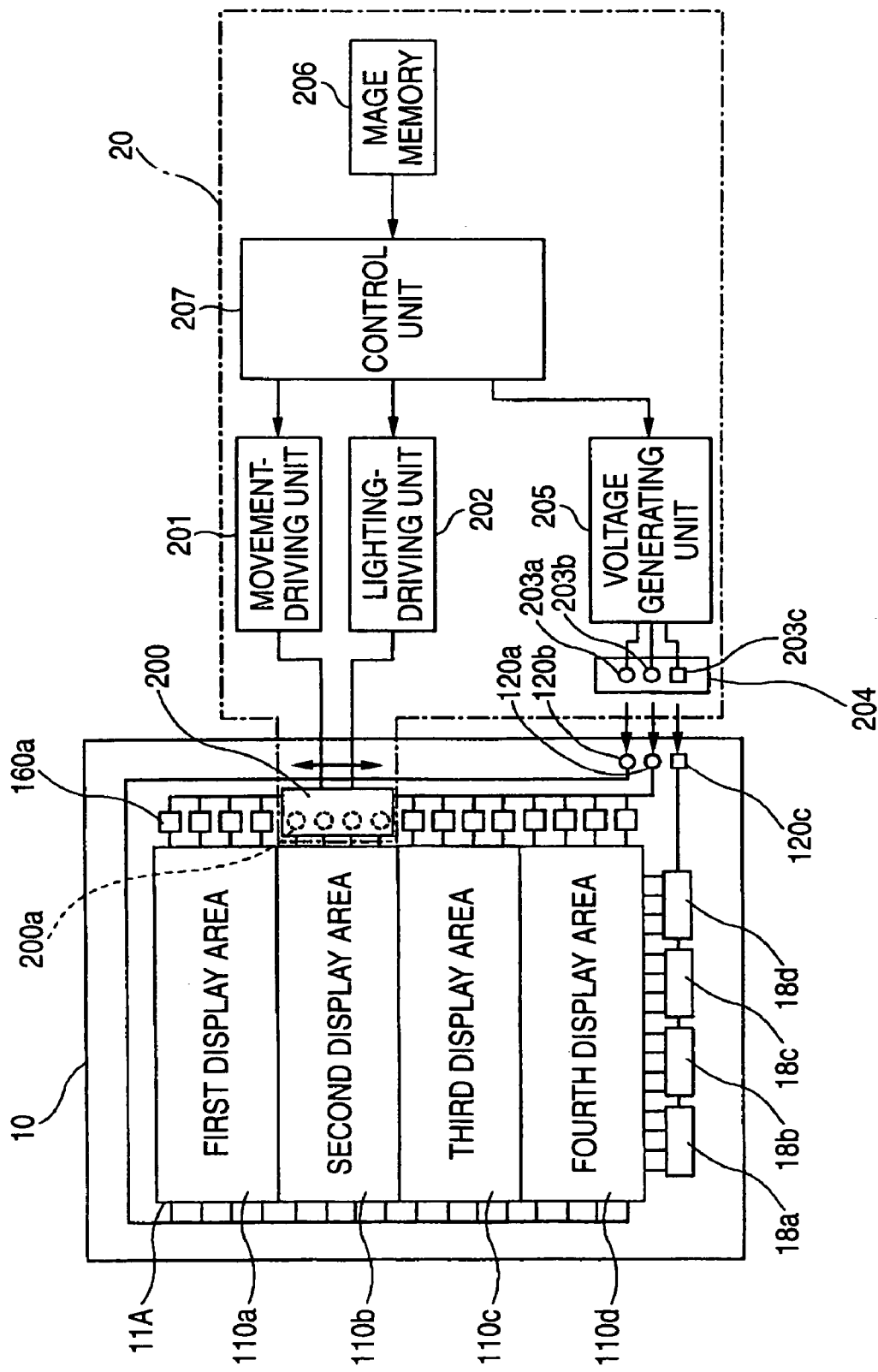
FIG. 17 is a connection view of an electronic paper and a plan view of an image writing apparatus according to the tenth embodiment of this invention.

FIG. 17 is a connection view of an electronic paper and a plan view of an image writing apparatus according to the tenth embodiment of this invention. In this tenth embodiment, the display unit 11A in the second embodiment is divided into plural display areas so that a light emitting device 200 is moved to write the image into each of the display areas.

In the electronic paper 10, the display area 11A is constructed of a plurality of first to fourth display areas 110a to 110d; a plurality of data driving ICs 18a to 18d for applying a data voltage to the column electrodes are arranged on the lower side of the display are 11A; a plurality of light receiving elements 160a for applying a scanning voltage to the row electrodes are arranged on the right side of the display unit 11A; a power receiving electrode 120c for supplying power, image signal and control signal such as the clock to the data driving ICs 18a to 18d is arranged in the vicinity of the corner; and in the vicinity of the power receiving electrode 120c, a power receiving electrode 120b connected to the light receiving elements 160a and a power receiving electrode 120a connected to the row electrodes are arranged.

The image writing apparatus 20 includes a light emitting device 200a including a plurality of light emitting elements 200a of LEDs for emitting driving signal light toward the light receiving elements 160a; a moving mechanism not shown for supporting the light emitting device 200 so that it is movable vertically (scanning direction) for each of the display areas 110a to 110d; a movement-driving unit 201 for vertically moving the light emitting device 200; a lighting-driving unit 202 for lighting the plurality of light emitting elements 200a arranged on the light emitting device 200; a power supply head 204 including a power supply terminals 203a, 203b, 203c contactable with the power receiving electrodes 120a to 120c; a voltage generating unit 205 for applying the voltage to the power receiving electrodes 120a to 120c through the power supply terminals 203a to 203c of the power supply head 204; an image memory 206 which store image data; and a control unit 207 for controlling the moving/driving unit 201, lighting-driving unit 202 and voltage generating unit 205 on the basis of the image data stored in the image memory 206 to write the image onto the display unit 11A.

In accordance with the tenth embodiment, the display area of the electronic paper 10 can be enlarged. The light emitting device can be down-sized. In the above configuration, the column electrodes were driven by the data driving IC, and the row electrodes were driven through the light receiving elements 160a. But the column electrodes may be driven through the light receiving elements and the column electrodes may be driven by the scan driving IC.

Embodiment 11

Figure 18A:
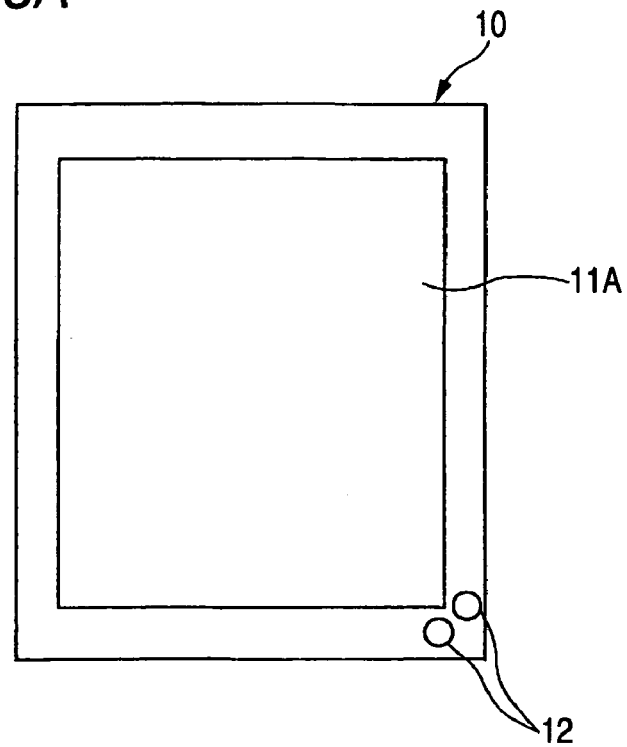
FIGS. 18A and 18B show an electronic paper according to the eleventh embodiment of this invention.
Figure 18B:
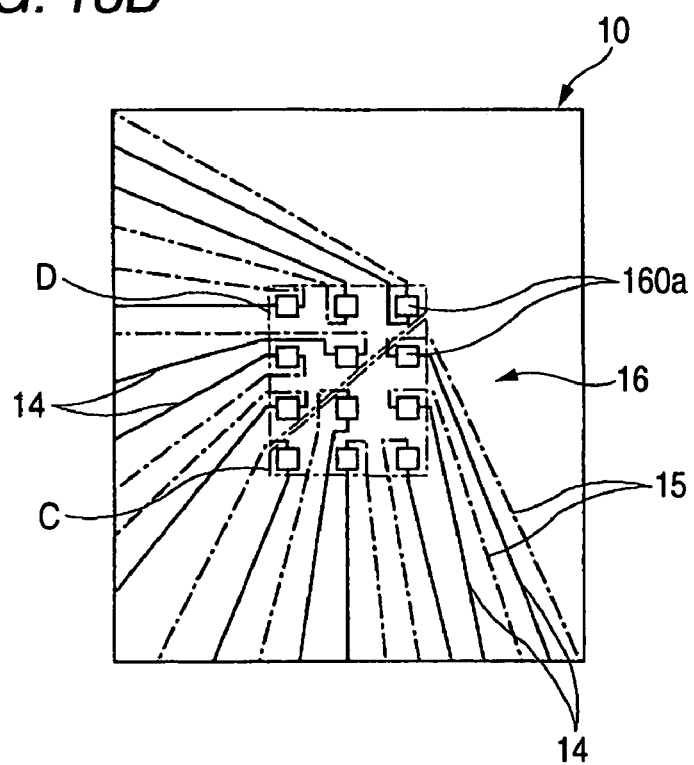

FIGS. 18A and 18B show an electronic paper according to the eleventh embodiment of this invention; FIG. 18A is a front surface view and FIG. 18B is a rear surface view. In this eleventh embodiment, the light receiving elements are arranged on the rear surface of the electronic paper 10, and the image writing apparatus has a light emitting area corresponding to the location of the light receiving elements. The remaining configuration is the same as the second embodiment.

This electronic paper 10, on the front surface, as seen from FIG. 18A, is provided with the display unit 11A at the center and the pair of power receiving electrodes 12 at the corner. Further, this electronic paper 10, on the rear surface, as seen from FIG. 18B, is provided with a plurality of light receiving elements arranged in a matrix shape at the practical center. For the light receiving elements 160a within a region C, the wiring patterns 14 connected to the column electrodes and wiring patterns 15 connected to the power receiving electrodes are formed radially. For the light receiving elements 160a within a region D, the wiring patterns 14 connected to the row electrodes and wiring patterns 15 connected to the power receiving electrodes 12 are formed radially.

In accordance with this ninth embodiment, the electronic paper 10 can be structured in a narrow frame, thereby permitting the display area to be enlarged. Incidentally, the paths of the wiring patterns may be designed so that the wiring resistances between the power receiving electrodes and the respective row electrodes and between the power receiving electrodes and the respective column electrodes are equal. Thus, the voltages applied to the respective pixels can be made equal, thus removing the nonuniform display.

Incidentally, the wiring passages of the wiring patterns 14 and 15 should not be limited to the radial shape but may be the other shape such as a stepped shape. Further, the light receiving elements 160a is not located to the center of the rear surface of the display unit 11A, but may be located at any position.

Embodiment 12

Figure 19:
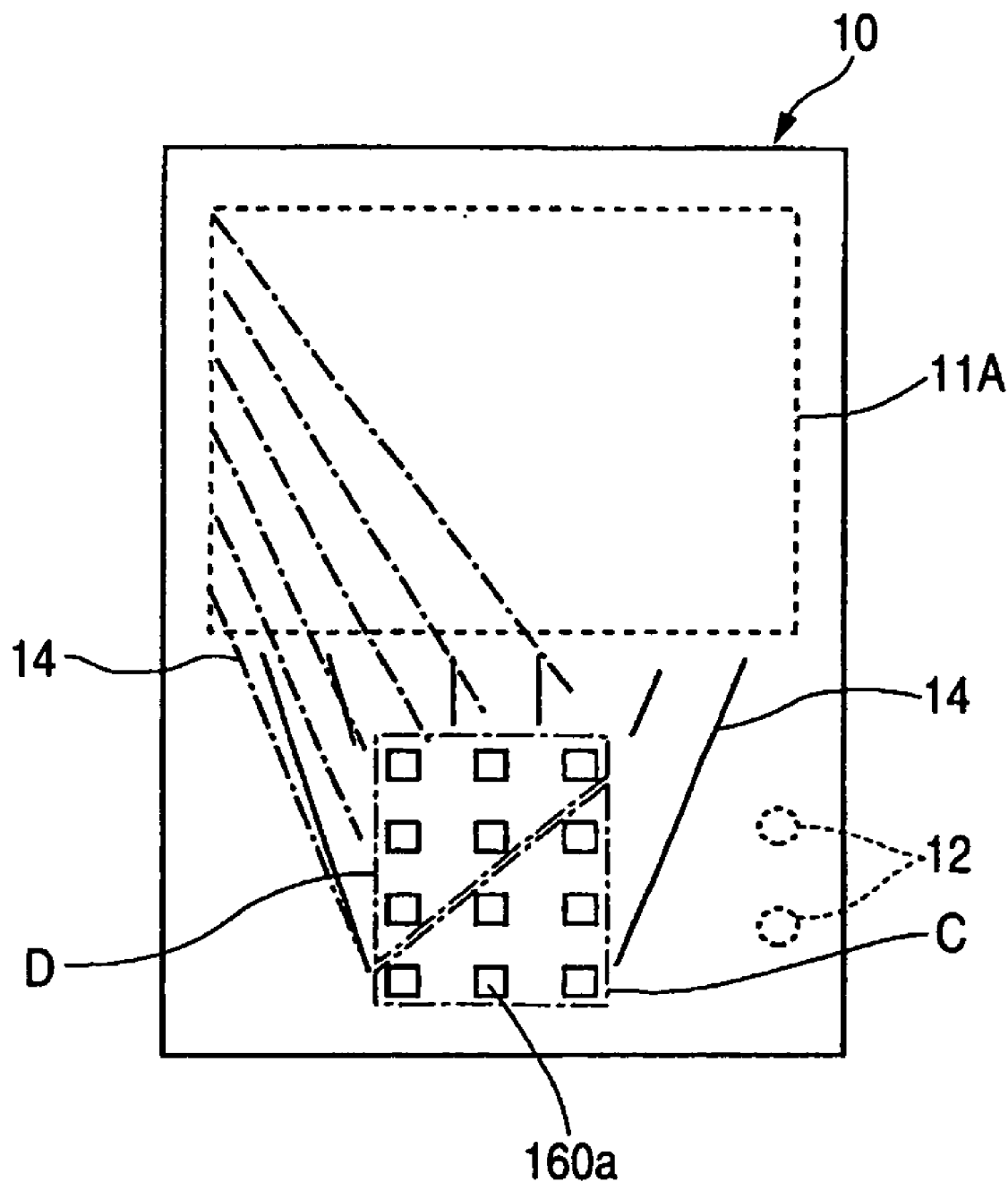
FIG. 19 is a rear surface view of an electronic paper according to the twelfth embodiment of this invention.

FIG. 19 is a rear surface view of an electronic paper according to the twelfth embodiment of this invention. In this twelfth embodiment, the electronic paper 10 according to the eleventh embodiment is formed of a multiple-layer board in which the light receiving elements 160a are arranged at a position apart from the display area 11A of the rear surface of the electronic paper 10 and the wiring patterns 14 and 15 are dispersed in the plural layers. The remaining configuration is the same as the eleventh embodiment. In FIG. 19, the wiring patterns 14 indicated in solid line and the wiring patterns 14 indicated in one-dot chain line are wired in different layers of the multiple-layer board, respectively. Further, wiring patterns not shown are connected from the light receiving elements 160a to the power receiving electrodes 12 provided on the front surface. In accordance with this twelfth embodiment, the degree of freedom of layout of the light receiving elements 160a can be increased.

Embodiment 13

Figure 20A:
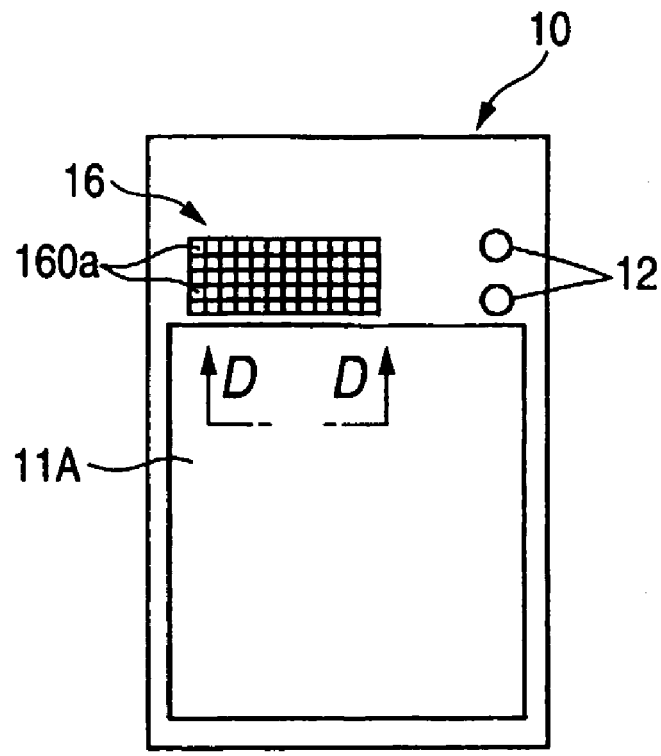
FIGS. 20A and 20B show an electronic paper according to the thirteenth embodiment of this invention.
Figure 20B:
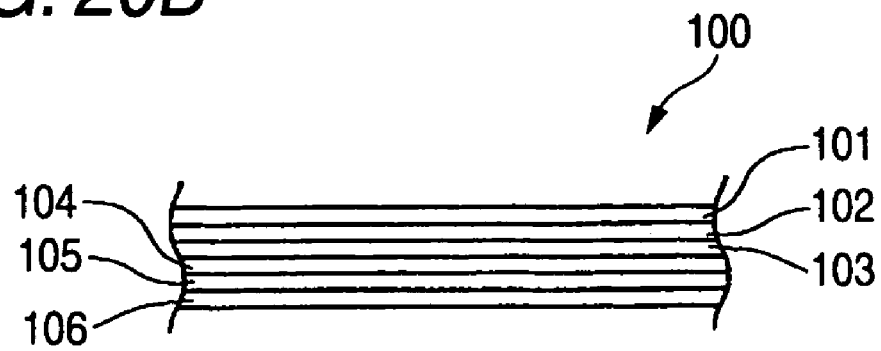

FIGS. 20A and 20B show an electronic paper according to the thirteenth embodiment of this invention; FIG. 20A is a front surface view and FIG. 20B is a sectional view taken in line D-D in FIG. 20A. FIGS. 21A to 21C and FIGS. 22A to 22C are sectional views showing the layer configuration of the electronic paper. FIG. 20D is a sectional view of the main part in the vicinity of the light receiving elements.

This electronic paper 10 is structured using a multi-layer wiring board, and as seen from FIG. 20A, is provided with the display unit 11A, a matrix light receiving area 16 including a plurality of light receiving elements 160a arranged in a matrix shape and a pair of electrodes 12. As seen from FIG. 20B, the electronic paper 10 includes, starting from the front surface, a first layer substrate 101, a second layer substrate 102, a third layer substrate 103, a fourth layer substrate 104, a fifth layer substrate 105 and a sixth layer substrate 106.

The first layer substrate 101, as seen from FIG. 21A, has a plurality of row electrodes 101a formed on an insulating substrate; the second layer substrate 102, as seen from FIG.

21B, has a display layer 102a of e.g. liquid crystal having a memory characteristic; and the third layer substrate 103, as seen from FIG. 21C, has a plurality of column electrodes 103a formed on an insulating substrate. The plurality of row electrodes 101a, display layer 102a and plurality of column electrodes 103a constitute the display unit 11A.

Figure 22A:
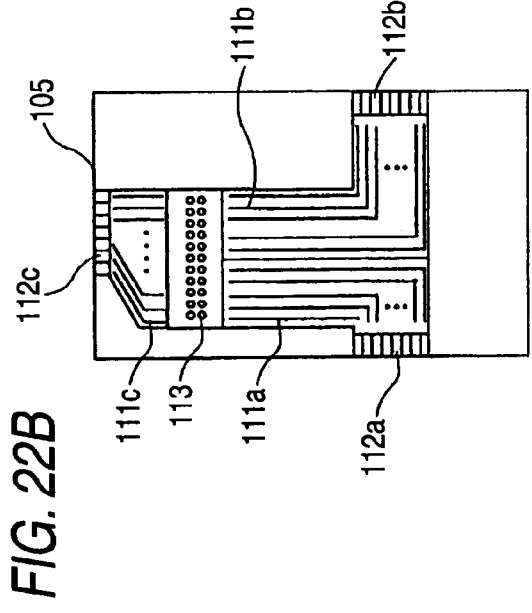
FIGS. 22A to 22C are sectional views showing the layer configuration of the electronic paper shown in FIG. 20
Figure 22B:
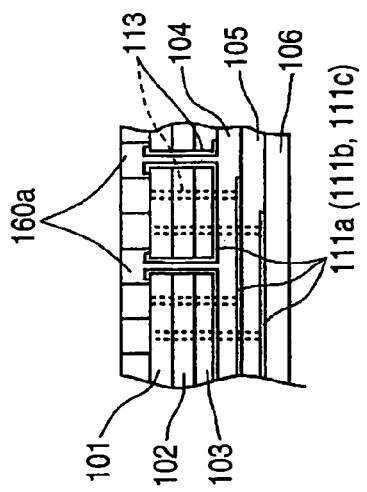
Figure 22C:
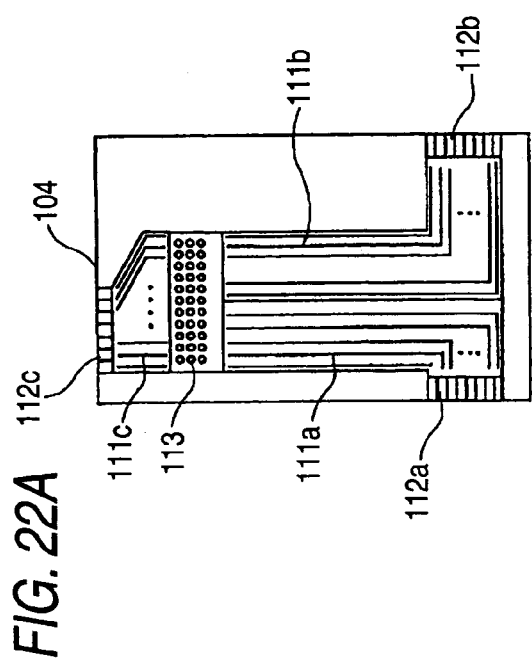

The fourth layer substrate 104, as seen from FIGS. 22A to 22C, on an insulating substrate, has via holes 113 connected to the light receiving elements 160a; wiring patterns 111a, 111b having connecting ends 112a, 112b connected to the row electrodes 101a of the first layer substrate 101 at their one end and connected to the via holes 113 at their other end; and a wiring pattern 111c having connecting ends 112c connected to the column electrodes 103a of the third layer substrate 103 at its one end and connected to the via holes 113 at its other end. The wiring patterns 111a are connected to the row electrodes 101 of odd rows and the wiring patterns 111b are connected to the row electrodes 101 of even rows.

Figure 22D:
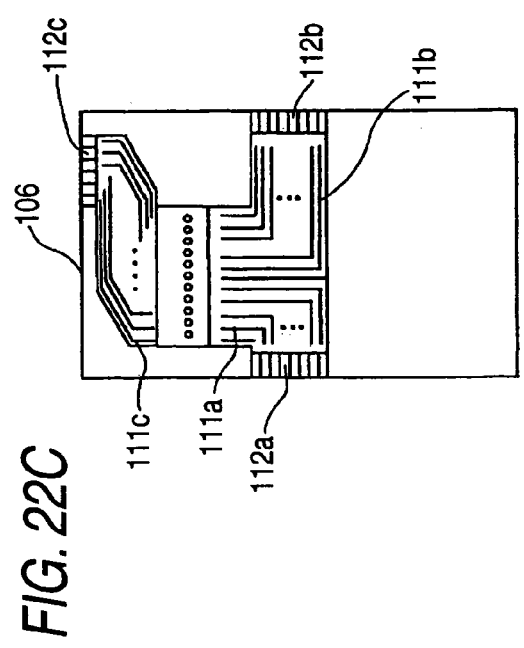
FIG. 22D is a sectional view of the main part in the vicinity of the light receiving elements.

The via holes 113, as seen from FIG. 22D, are arranged dispersively so that they do not overlap with one another in the fourth layer substrate 104, fifth layer substrate 105 and sixth layer substrate 106.

The light receiving elements 160a, as seen from FIG. 22D, are connected to the wiring patterns 111a to 111c formed on the fourth to sixth layer substrates 104, 105 and 106 through the via holes 113.

In accordance with this thirteenth embodiment, since the wiring patterns of the electronic paper are constituted by the multi-layer wiring board, the display area can be enlarged.

Embodiment 14

Figure 23:
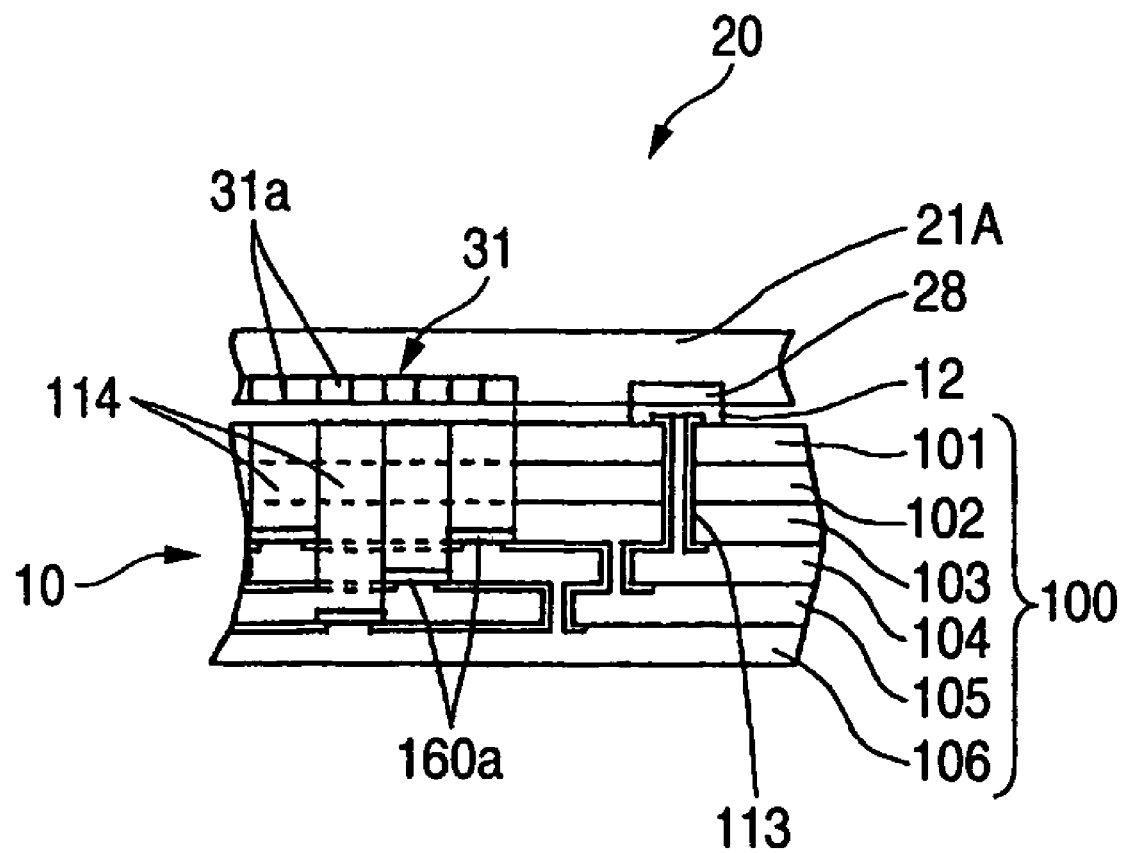
FIG. 23 is a sectional view of the main part of an electronic paper according to the fourteenth embodiment of this invention.

FIG. 23 is a sectional view of the main part of the electronic paper according to the fourteenth embodiment of this invention. The electronic paper 10 according to this fourteenth embodiment has a structure in which in the thirteenth embodiment, the light receiving elements 160a are formed on the third layer substrate 103, fourth layer substrate 104 and fifth layer substrate 105; and the wiring patterns 111a to 111c formed on the third to fifth layer substrates 103 to 105 are connected through the via holes 113. The electronic paper 10 is designed so that driving signal light is incident on each of the light receiving elements 160a from the matrix display unit 31 of the image writing apparatus 20. In accordance with the fourteenth embodiment, the light receiving elements 160a can be mounted with high density.

Embodiment 15

Figure 24:
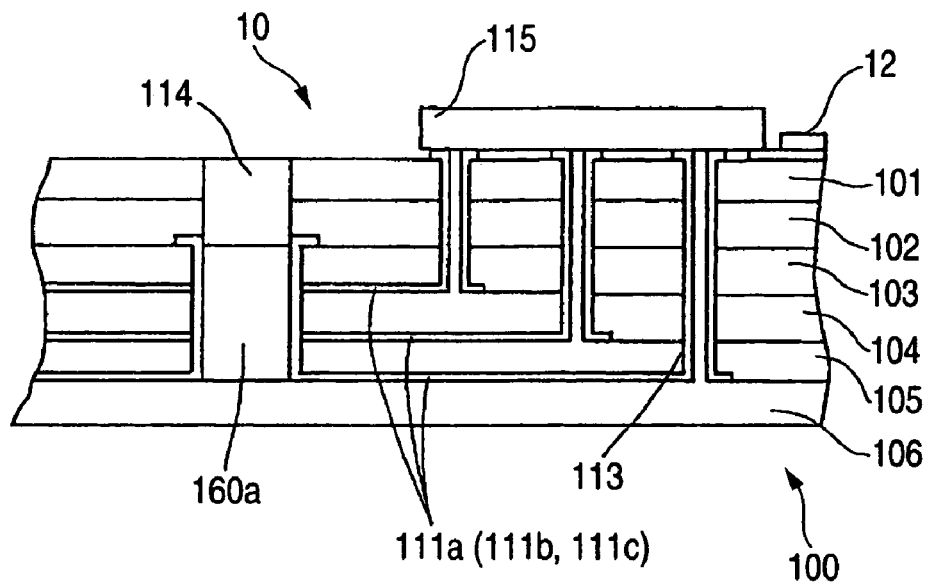
FIG. 24 is a sectional view of the main part of an electronic paper according to the fifteenth embodiment of this invention.

FIG. 24 is a sectional view of the main part of an electronic paper according to the fifteenth embodiment of this invention. The electronic paper 10 according to this fifteenth embodiment is designed so that in the fourteenth embodiment, each of the light receiving elements 160a is formed over the third layer substrate 103, fourth layer substrate 104 and fifth layer substrate 105; the driving signal light is made incident on the light receiving element 160a; a switching element 115 which is connected to the power receiving electrode 12 and performs a switching operation by an electric signal like a transistor is formed on the first layer substrate 101; the switching element 115 is connected to the wiring patterns 111a to 111c on the fourth to sixth layer substrates through the via hole 113; and the wiring patterns 111a to 111c are changed by the switching element 115.

In accordance with the fifteenth embodiment, the number of the light receiving elements 160a can be decreased. Incidentally, the switching element 115 may be a device which performs the switching operation by light like a photoconductor.

Embodiment 16

Figure 25:
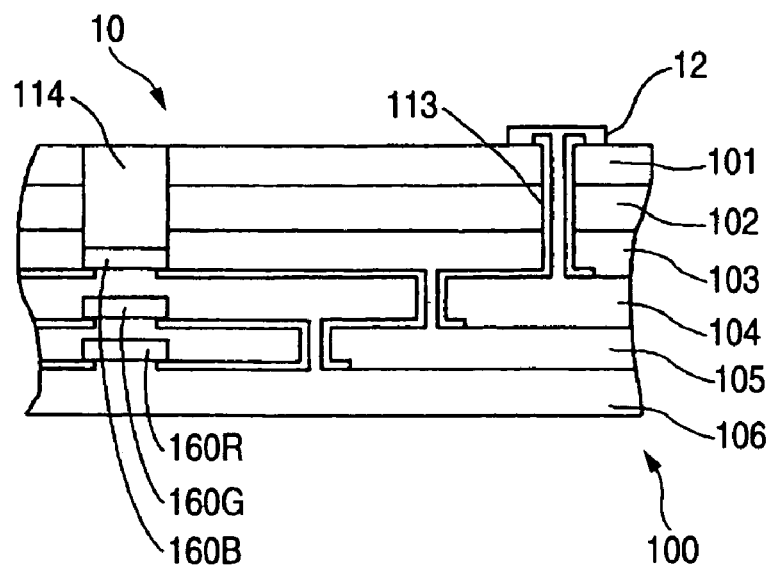
FIG. 25 is a sectional view of the main part of an electronic paper according to the sixteenth embodiment of this invention.

FIG. 25 is a sectional view of the main part of an electronic paper according to the sixteenth embodiment of this invention. The electronic paper according to this sixteenth embodiment is so designed that in the fifteenth embodiment, in place of the light receiving element 160a, a light receiving element 160R operated by red light, a light receiving element 160G operated by green light and a light receiving element 160B operated by blue light are employed; and the display area of the image writing apparatus 20 is constructed of a red LED emitting red light, a green LED emitting green light and a blue LED emitting blue light.

In accordance with this sixteenth embodiment, since the light receiving elements react to only specific wavelengths, even where the relative position accuracy between the display unit of the image writing apparatus and the light receiving elements is low, an exact operation can be done. Incidentally, the light receiving elements may be provided with filters. Further, the light receiving elements having small, intermediate and large different light receiving areas may be arranged sequentially from a light incident side so that driving signal light is directly incident on the light receiving elements. The light receiving elements 160R, 160G and 160B may be arranged to be displaced horizontally as shown in FIG. 23.

Other Embodiments

Additionally, this invention should not be limited to the respective embodiments described above, but can be realized in various modifications within a scope not departing from the spirit. For example, the combination of the constituent elements among the respective embodiments can be made optionally.

In the embodiments described above, the light receiving element array serving as the driving unit should not be limited to the configuration operated by light, but may be a heat-sensitive element such as a thermistor operated by heat received as a driving signal, a magnetoresistance element operated by a magnetic field, a magnetism-sensitive element such as a Hall device and a magnetic transistor, or a pressure-sensitive element such as a pressure sensitive diode and a pressure sensitive transistor.

As a driving signal generating element for the image writing apparatus, an optical element such as the LED array was exemplified. But it may be a heat generator such as a heater generating according to the active element of the image display medium, a thin-film magnetic transducer generating the magnetic field or a piezoelectric element generating pressure.

The image writing apparatus 20 was designed as a folding type. But it should not be limited to this type but may be constructed by only the upper body or lower body.

The display unit may be provided with overall electrodes and a plurality of pixels arranged between the overall electrodes so that voltage is selectively applied between the entire electrodes and plurality of electrodes by active matrix driving.

The display unit having the memory characteristic, in addition to that described above, may be realized by a heat-sensitive recording medium using Leuco dye, liquid crystal having the memory characteristic represented by ferromagnetic liquid crystal, an electrophoresis system which changes display by moving charged particle, a particle rotating system which changes display by rotating charged particles, or a magnetophoresis system which changes display by moving particles by magnetism.

What is claimed is:

1. An image display medium for enabling an image writing apparatus to supply the image display medium with a voltage for applying energy for writing comprising:
    a display unit having a memory characteristic including a plurality of pixels;
    an input terminal externally supplied with a voltage; and
    a selecting unit receiving a driving signal by at least one of external light, heat, and pressure to apply the voltage supplied to the input terminal, the selecting unit being provided with a plurality of function elements for applying the voltage to the plurality of pixels on the basis of the received driving signal,
    wherein the function elements are photoelectric conversion elements,
    the plurality of photoelectric conversion elements are a plurality of photoconductive elements having different characteristics according to wiring resistance to the plurality of pixels of the display unit,
    the plurality of photoconductive elements are connected using a multiple-layer board with wiring Patterns formed on a plurality of layers, and
    the plurality of photoconductive elements are arranged in a plurality of via holes on the plurality of layers.

2. The image display medium according to claim 1, wherein the selecting unit is provided with a plurality of variable resistor elements whose resistance varies according to the driving signal.

3. The image display medium according to claim 1, wherein the display unit is provided with a plurality of row electrodes and a plurality of column electrodes,
    the plurality of pixels are disposed between the plurality of column electrodes and the plurality of row electrodes, and
    the selecting unit selectively applies the voltage between the plurality of row electrodes and the plurality of column electrodes by simple matrix driving.

4. The image display medium according to claim 1, wherein the display unit is provided with overall electrodes and a plurality of pixels arranged between the overall electrodes, and
    the selecting unit selectively applies the voltage between the overall electrode and the plurality of pixels by active matrix driving.

5. The image display medium according to claim 1, wherein each the pixels is formed of liquid crystal having the memory characteristic.

6. The image display medium according to claim 1, wherein each pixel has a predetermined charging characteristic, and
    each pixel includes a particle moving in a space according to the electric field formed by the voltage.

7. The image display medium according to claim 1, wherein the plurality of function elements are arranged in a matrix shape at position where the display unit is not overlapped.

8. The image display medium according to claim 1, wherein the plurality of function elements are arranged in a matrix shape at position where the display unit is overlapped.

9. The image display medium according to claim 1, wherein the plurality of photoconductive elements have different light receiving areas so that a received quantity of light increases with an increase in the wiring resistance.

10. The image display medium according to claim 1, the image display medium further including,
    wirings electrically connecting between the photoconductive elements and the pixels, and
    a mask which provides different light shielding areas for shielding light receiving faces of the photoconductive elements, so that a received quantity of light of each of the photoconductive elements increases with an increase in a resistance of each of the wirings.

11. The image display medium according to claim 1, the image display medium further including,
    wirings electrically connecting between the photoconductive elements and the pixels, and
    a filter which provides different light transmittances so that a received quantity of light of each of the photoconductive elements increases with an increase in a resistance of each of the wirings.

12. The image display medium according to claim 1, wherein the selecting unit includes the plurality of photo conductive elements for selectively applying the voltage supplied to the input terminal to the plurality of pixels on the basis of light of the driving signal externally supplied; and a driving IC for selectively applying the voltage applied to the input terminal to the plurality of pixels on the basis of a control signal supplied from the input terminal.

13. The image display medium according to claim 1, wherein the selecting unit includes the plurality of photoconductive elements for selectively applying the voltage supplied to the input terminal to the plurality of pixels on the basis of light of the driving signal externally supplied; and a driving IC for selectively applying the voltage applied to the input terminal to the plurality of pixels on the basis of the driving signal externally supplied.

14. The image display medium according to claim 1, wherein the plurality of photoconductive elements are located at a position on a rear surface opposite to the display unit.

15. The image display medium according to claim 1, wherein the plurality of photoconductive elements are located at position on a rear surface not opposite to the display unit.

16. The image display medium according to claim 1, wherein the plurality of photoconductive elements have different wavelength sensitivities, and
    wherein the plurality of photoconductive elements are arranged dispersively on the plurality of layers.

17. An image display medium for enabling an image writing apparatus to supply the image display medium with a voltage for applying energy for writing comprising:
    a display unit having a memory characteristic including a plurality of pixels;
    an input terminal externally supplied with a voltage; and
    a selecting unit receiving a driving signal by at least one of external light, heat, and pressure to apply the voltage supplied to the input terminal, the selecting unit being provided with a plurality of function elements for applying the voltage to the plurality of pixels on the basis of the received driving signal,
    wherein the function elements are photoelectric conversion elements,
    the plurality of photoelectric conversion elements are a plurality of photoconductive elements having different characteristics according to wiring resistance to the plurality of pixels of the display unit,
    the plurality of photoconductive elements are connected using a multiple-layer board with wiring patterns formed on a plurality of layers,
    the plurality of photoconductive elements are arranged in a via hole over the plurality of layers, and
    the wiring patterns are selected by a switching element.

18. The image display medium according to claim 17, wherein the selecting unit is provided with a plurality of variable resistor elements whose resistance varies according to the driving signal.

19. The image display medium according to claim 17, wherein the display unit is provided with a plurality of row electrodes and a plurality of column electrodes,
the plurality of pixels are disposed between the plurality of column electrodes and the plurality of row electrodes, and
the selecting unit selectively applies the voltage between the plurality of row electrodes and the plurality of column electrodes by simple matrix driving.

20. The image display medium according to claim 17, wherein the display unit is provided with overall electrodes and a plurality of pixels arranged between the overall electrodes, and
the selecting unit selectively applies the voltage between the overall electrode and the plurality of pixels by active matrix driving.

21. The image display medium according to claim 17, wherein each the pixels is formed of liquid crystal having the memory characteristic.

22. The image display medium according to claim 17, wherein each pixel has a predetermined charging characteristic, and
each pixel includes a particle moving in a space according to the electric field formed by the voltage.

23. The image display medium according to claim 17, wherein the plurality of function elements are arranged in a matrix shape at a position where the display unit is not overlapped.

24. The image display medium according to claim 17, wherein the plurality of function elements are arranged in a matrix shape at a position where the display unit is overlapped.

25. The image display medium according to claim 17, wherein the plurality of photoconductive elements have different light receiving areas so that a received quantity of light increases with an increase in the wiring resistance.

26. The image display medium according to claim 17, wherein the photoelectric conversion elements are photoconductive elements,
the image display medium further including,
wirings electrically connecting between the photoconductive elements and the pixels, and
a mask which provides different light shielding areas for shielding light receiving faces of the photoconductive elements, so that a received quantity of light of each of the photoconductive elements increases with an increase in a resistance of each of the wirings.

27. The image display medium according to claim 17, wherein the photoelectric conversion elements are photoconductive elements,
the image display medium further including,
wirings electrically connecting between the photoconductive elements and the pixels, and
a filter which provides different light transmittances so that a received quantity of light of each of the photoconductive elements increases with an increase in a resistance of each of the wirings.

28. The image display medium according to claim 17, wherein the selecting unit includes the plurality of photoconductive elements for selectively applying the voltage supplied to the input terminal to the plurality of pixels on the basis of light of the driving signal externally supplied; and a driving IC for selectively applying the voltage applied to the input terminal to the plurality of pixels on the basis of a control signal supplied from the input terminal.

29. The image display medium according to claim 17, wherein the selecting unit includes the plurality of photoconductive elements for selectively applying the voltage supplied to the input terminal to the plurality of pixels on the basis of light of the driving signal externally supplied; and a driving IC for selectively applying the voltage applied to the input terminal to the plurality of pixels on the basis of the driving signal externally supplied.

30. The image display medium according to claim 17, wherein the plurality of photoconductive elements are located at position on a rear surface opposite to the display unit.

31. The image display medium according to claim 17, wherein the plurality of photoconductive elements are located at position on a rear surface not opposite to the display unit.

32. The image display medium according to claim 17, wherein the plurality of photoconductive elements are connected using a multiple-layer board with wiring patterns formed on a plurality of layers.

33. The image display medium according to claim 17, wherein the plurality of photoconductive elements have different wavelength sensitivities, and
the plurality of photoconductive elements are arranged dispersively on the plurality of layers.

* * * * *